(12) United States Patent
Yamamoto et al.

(10) Patent No.: US 7,599,272 B2
(45) Date of Patent: Oct. 6, 2009

(54) METHOD AND APPARATUS FOR RECORDING AND REPRODUCING MULTI-LEVEL INFORMATION

(75) Inventors: Masakuni Yamamoto, Yamato (JP); Jun Sumioka, Ohta-ku (JP)

(73) Assignee: Canon Kabushiki Kaisha, Tokyo (JP)

(*) Notice: Subject to any disclaimer, the term of this patent is extended or adjusted under 35 U.S.C. 154(b) by 740 days.

(21) Appl. No.: 11/283,963

(22) Filed: Nov. 22, 2005

(65) Prior Publication Data

US 2006/0109769 A1 May 25, 2006

(30) Foreign Application Priority Data

Nov. 22, 2004 (JP) ............................ 2004-337574
Feb. 23, 2005 (JP) ............................ 2005-047198

(51) Int. Cl.
*G11B 7/005* (2006.01)
*G11B 7/013* (2006.01)
*G11B 7/0045* (2006.01)

(52) U.S. Cl. ............... 369/59.23; 369/59.11; 369/59.18

(58) Field of Classification Search ............... 369/50, 369/56, 59.11–59.12, 59.17–59.18, 59.23–59.24
See application file for complete search history.

(56) References Cited

U.S. PATENT DOCUMENTS

| | | | |
|---|---|---|---|
| 4,912,694 A | 3/1990 | Yamamoto | 369/59 |
| 4,923,766 A | 5/1990 | Hosoi et al. | 428/694 |
| 5,199,023 A | 3/1993 | Yamamoto et al. | 369/275.4 |
| 5,233,578 A | 8/1993 | Yamamoto et al. | 369/13 |
| 5,280,160 A | 1/1994 | Yamamoto et al. | 235/454 |
| 5,329,517 A | 7/1994 | Yamaguchi et al. | 369/110 |
| 5,428,586 A | 6/1995 | Kobayashi et al. | 369/13 |
| 5,517,471 A | 5/1996 | Ashinuma et al. | 369/13 |
| 5,539,718 A | 7/1996 | Hoshi et al. | 369/100 |
| 5,555,231 A | 9/1996 | Yamamoto | 369/100 |
| 5,557,592 A * | 9/1996 | Kobayashi et al. | 369/47.27 |
| 5,577,017 A | 11/1996 | Yamamoto et al. | 369/110 |
| 5,581,532 A | 12/1996 | Matsumura et al. | 369/110 |
| 5,668,872 A | 9/1997 | Morishima et al. | 380/4 |
| 5,701,279 A | 12/1997 | Hoshi et al. | 369/13 |
| 5,712,840 A | 1/1998 | Matsumura et al. | 369/112 |
| 5,768,219 A | 6/1998 | Yamamoto et al. | 369/13 |
| 5,777,974 A | 7/1998 | Yamamoto | 369/112 |
| 5,786,117 A | 7/1998 | Hoshi et al. | 430/21 |

(Continued)

FOREIGN PATENT DOCUMENTS

JP   5-128530   5/1993

*Primary Examiner*—Andrea L Wellington
*Assistant Examiner*—Nathan Danielsen
(74) *Attorney, Agent, or Firm*—Fitzpatrick, Cella, Harper & Scinto

(57) ABSTRACT

The present invention provides a multi-level information recording/reproducing method of recording or reproducing multi-level information by virtually setting cells at constant regular intervals on a track of an optical information medium where information is recorded or reproduced with a light spot and by varying an information pit width in a direction of the track or an information pit area, comprising the steps of: detecting a reproduced signal by radiating a light spot onto the track; detecting a cell border value by sampling the reproduced signal when the center of the light spot falls on a border between one cell and its following cell; and judging multi-level information of the following cell based on the cell border value.

4 Claims, 21 Drawing Sheets

U.S. PATENT DOCUMENTS

| | | | |
|---|---|---|---|
| 5,841,755 A | 11/1998 | Yamamoto et al. | 369/118 |
| 5,956,296 A | 9/1999 | Yamamoto et al. | 369/13 |
| 5,956,297 A | 9/1999 | Yamamoto | 369/13 |
| 6,104,676 A | 8/2000 | Yamamoto | 369/13 |
| 6,249,489 B1 | 6/2001 | Fujii et al. | 369/13 |
| 6,298,015 B1 | 10/2001 | Ishii et al. | 369/13 |
| 2003/0223341 A1* | 12/2003 | Minagawa | 369/59.22 |
| 2004/0085878 A1* | 5/2004 | Sakagami et al. | 369/59.23 |
| 2007/0050790 A1 | 3/2007 | Yamamoto et al. | 720/617 |

* cited by examiner

CELL CENTER VALUE DISTRIBUTION

FIG. 19

| CELL BORDER VALUE | COMBINATION OF MULTI-LEVELS OF LEFT AND RIGHT CELLS | | | | | | |
|---|---|---|---|---|---|---|---|
| 00 | (0,0) | | | | | | |
| 01 | (0,1) | (1,0) | | | | | |
| 02 | (0,2) | (2,0) | (1,1) | | | | |
| 03 | (0,3) | (3,0) | (1,2) | (2,1) | | | |
| 04 | (0,4) | (4,0) | (1,3) | (3,1) | (2,2) | | |
| 05 | (0,5) | (5,0) | (1,4) | (4,1) | (2,3) | (3,2) | |
| 06 | (0,6) | (6,0) | (1,5) | (5,1) | (2,4) | (4,2) | (3,3) |
| 07 | (0,7) | (7,0) | (1,6) | (6,1) | (2,5) | (5,2) | (3,4) (4,3) |
| 08 | (1,7) | (7,1) | (2,6) | (6,2) | (3,5) | (5,3) | (4,4) |
| 09 | (2,7) | (7,2) | (3,6) | (6,3) | (4,5) | (5,4) | |
| 10 | (3,7) | (7,3) | (4,6) | (6,4) | (5,5) | | |
| 11 | (4,7) | (7,4) | (5,6) | (6,5) | | | |
| 12 | (5,7) | (7,5) | (6,6) | | | | |
| 13 | (6,7) | (7,6) | | | | | |
| 14 | (7,7) | | | | | | |

FIG. 21A
CELL CENTER VALUE LEARNING TABLE

| TABLE | PRECEDING CELL | CELL IN QUESTION | FOLLOWING CELL |
|---|---|---|---|
| 1 | 0 | 0 | 0 |
| 2 | 0 | 1 | 0 |
| 3 | 0 | 2 | 0 |
| 4 | 0 | 3 | 0 |
| ⋮ | | ⋮ | |
| 511 | 7 | 6 | 7 |
| 512 | 7 | 7 | 7 |

FIG. 21B
CELL BORDER VALUE LEARNING TABLE

| TABLE | PRECEDING CELL | CELL IN QUESTION |
|---|---|---|
| 1 | 0 | 0 |
| 2 | 0 | 1 |
| 3 | 0 | 2 |
| 4 | 0 | 3 |
| ⋮ | | ⋮ |
| 63 | 7 | 6 |
| 64 | 7 | 7 |

METHOD AND APPARATUS FOR RECORDING AND REPRODUCING MULTI-LEVEL INFORMATION

BACKGROUND OF THE INVENTION

1. Field of the Invention

The present invention relates to a multi-level information recording/reproducing method and apparatus for recording or reproducing multi-level information.

2. Related Background Art

The optical memory industry is lately expanding with the development of read-only CD/DVDs, the add-on type using metal thin films or recording dyes, and, ultimately, the rewritable type using magneto-optical materials or phase transition materials. Also, optical memories now have a wider range of applications from consumer products to external memories of computers. Research and development are underway to enhance the density of recording capacity, and one of the findings is that employing a blue-violet light source (wavelength: 405 nm) rather than a red light source (wavelength: 650 nm) is an effective technique of reducing the size of a light spot for recording and reproducing information. Another technique found effective in reducing the light spot in size is to raise the numerical aperture of an object lens from 0.6 or 0.65 to 0.85. Meanwhile, multi-level recording/reproducing technologies have been proposed which achieve higher efficiency with the same light spot size as before.

For instance, the inventors of the present invention have proposed, in Japanese Patent Application Laid-open No. H05-128530 as a system of multi-level recording/reproducing technologies, a recording method of recording multi-level information on an information track of an optical information recording medium by using a combination of an information pit's width in the direction of the track and a shift amount in the track direction with respect to a light spot for reproduction of its information pit; and a reproducing method for reproducing multi-level information based on a correlation between a detection signal learned in advance and a detection signal obtained form the light spot in reproduction of the information pit recorded by the multi-level recording method.

Another example is a presentation delivered at ISOM 2003, an international academic conference for researches in the field of optical disks ("Write-once Disks for Multi-level Optical Recording", Conference Papers Fr-Po-04). The presentation is about 8-level recording/reproduction using a blue-violet light source (405 nm) and an optical system with an NA of 0.65, and setting the width in a track direction of a region (hereinafter, referred to as "cell"), which is a virtually provided area on an optical disk having a track pitch of 0.46 µm and which stores one information pit, to 0.26 µm.

The selection of an information pit of 8 levels is carried by dividing a cell's width in the track direction into 16 equal parts (16 channel bits), for example, as shown in FIG. 12, with Level Zero being no information pit recorded, Level One corresponding to the width of 2 channel bits, Level Two corresponding to the width of 4 channel bits, Level Three corresponding to the width of 6 channel bits, Level Four corresponding to the width of 8 channel bits, Level Five corresponding to the width of 10 channel bits, Level Six corresponding to the width of 12 channel bits, and Level Seven corresponding to the width of 14 channel bits.

Information pits having the thus selected levels are recorded at random, a photodetector receives light reflected by the information pits to detect a reflected light amount, and a signal reproduced from the obtained multi-level information pits is sampled when the center of the light spot falls on the cell's widthwise center in the track direction. Then, the amplitude of the reproduced signal for each level is distributed as shown in FIG. 13.

Here, the amplitude of the reproduced signal is standardized such that the reproduced signal has an amplitude of "1" when Level Zero, meaning no information pits recorded, is read successively, and that the reproduced signal has an amplitude of "0" when Level Seven information pits are recorded in succession.

The value of the reproduced signal for each level fluctuates because an information pit in question is influenced by its preceding and following information pits (inter-symbol interference). When the amplitude distribution of the reproduced signal for one level overlaps with those of adjacent levels as shown in FIG. 13, it is impossible to detect them separately with a fixed threshold.

The presentation at ISOM 2003 has introduced, as an example of how to solve the above problem, a separate detection method including a step of reading and storing a signal that is reproduced from a pit string consisting of an information pit in question and its preceding and following information pits, all three of which have known values (learning), and a step of comparing the stored value with a signal reproduced from the actual information pit (checking a correlation). According to this method, the recording density is approximately 16 G bit/inch$^2$.

There has been an attempt to achieve as high a recording density as approximately 30 G bit/inch$^2$ by modifying the multi-level method delivered at ISOM 2003 such that the light spot is reduced in size with the use of a blue-violet light source (405 nm) and an optical system having an NA of 0.85. However, this causes more inter-symbol interference and more overlapping of the reproduced signal amplitude distribution between neighboring levels shown in FIG. 13, which can increase erroneous reproduction unless some measure is taken.

SUMMARY OF THE INVENTION

An object of the present invention is to provide a multi-level information recording/reproducing method and apparatus capable of recording and reproducing multi-level information with a high density.

The multi-level information recording/reproducing method of the present invention is a multi-level information recording/reproducing method for recording or reproducing multi-level information by virtually setting cells at constant intervals on a track of an optical information medium where information is recorded or reproduced with a light spot and by varying an information pit width in a direction of the track or an information pit area, including the steps of: detecting a reproduced signal by radiating a light spot onto the track; detecting a cell border value by sampling the reproduced signal when the center of the light spot falls on a border between one cell and its following cell; and judging multi-level information of the following cell based on the cell border value.

Further, the apparatus of the present invention is a multi-level information recording/reproducing apparatus for recording or reproducing multi-level information by virtually setting cells at constant intervals on a track of an optical information medium where information is recorded or reproduced with a light spot and by varying an information pit width in a direction of the track or an information pit area, including: a circuit for detecting a reproduced signal by radiating a light spot onto the track; a circuit for detecting a cell border value by sampling the reproduced signal when the center of the light spot falls on a border between one cell and its following cell; and a circuit for judging multi-level information of the following cell based on the cell border value.

BRIEF DESCRIPTION OF THE DRAWINGS

FIG. 19 is a diagram showing a combination of the multi-levels of left and right cells in association with a cell border value;

FIGS. 21A and 21B are diagrams each showing a learning table for use in judging multi-level data, with FIG. 21A showing a cell center value learning table and FIG. 21B showing a cell border value learning table;

DESCRIPTION OF THE PREFERRED EMBODIMENTS

First Embodiment

Figure 1:
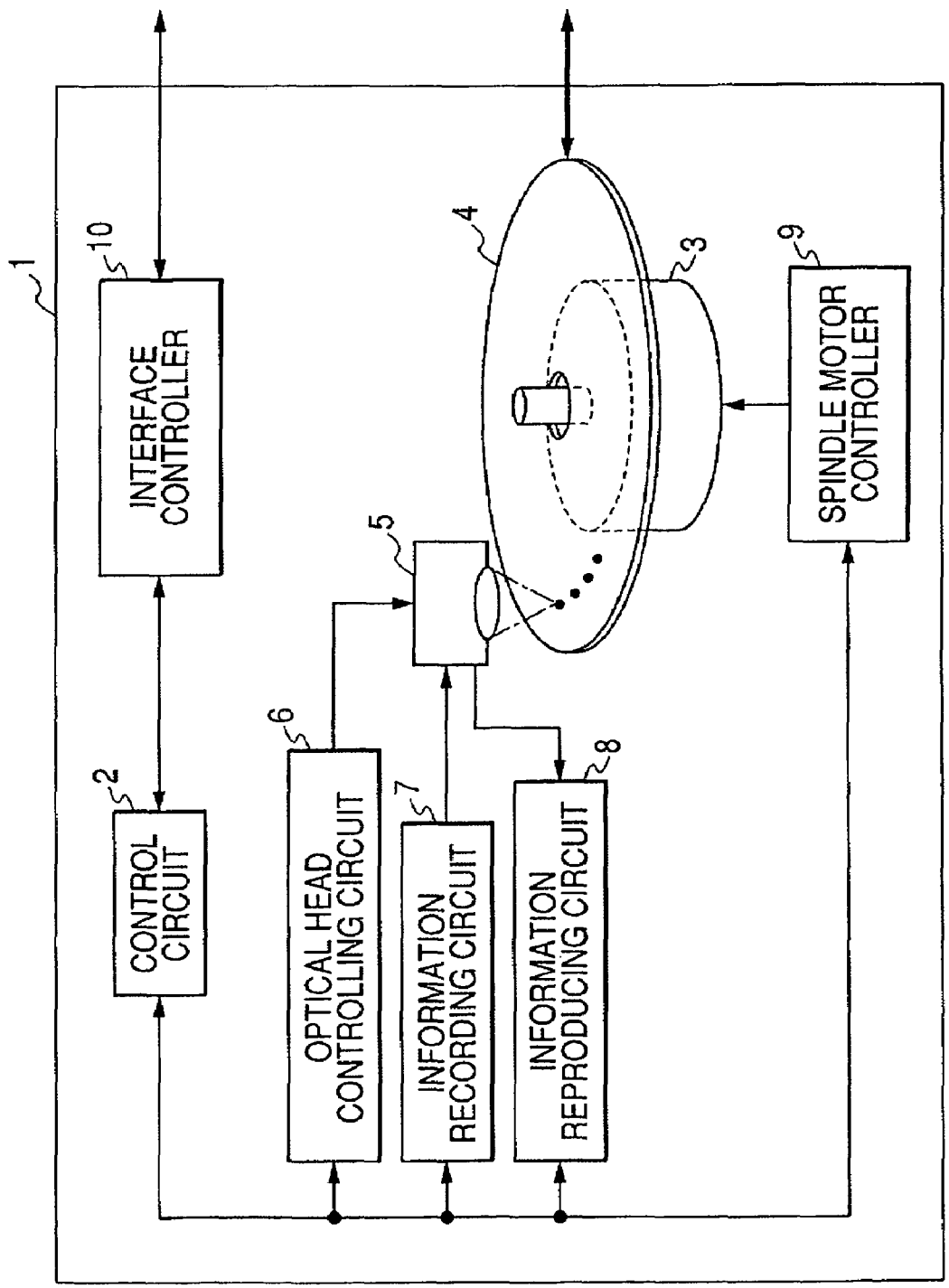
FIG. 1 is a block diagram showing an embodiment of a multi-level information recording/reproducing apparatus according to the present invention.

Now, with reference to the accompanying drawings, a detailed description will be given on the best mode of carrying out the present invention. FIG. 1 is a block diagram showing the constitution of a first embodiment of a multi-level information recording/reproducing apparatus according to the present invention.

A multi-level information recording/reproducing apparatus 1 has a control circuit 2, a spindle motor 3, an optical disk 4, an optical head 5, an optical head controlling circuit 6, an information recording circuit 7, an information reproducing circuit 8, a spindle motor controller 9, and an interface controller 10. The control circuit 2 controls exchanges of information with an external information processing apparatus such as a computer, controls the information recording circuit 7 to record information in the optical disk 4, controls the information reproducing circuit 8 to reproduce information from the optical disk 4, and controls other operating portions. The information recording circuit 7 records multi-level information as will be described later, and the information reproducing circuit 8 reproduces multi-level information.

The spindle motor 3 is controlled by the spindle motor controller 9 to drive and turn the optical disk 4. The optical disk 4 is an optical information recording medium that can be inserted to and ejected from the multi-level information recording/reproducing apparatus 1 through a mechanism (not shown).

The optical head 5 optically records information in the optical disk 4 and reproduces the recorded information. For instance, when the optical head 5 uses a light source having a wavelength of 405 nm and an objective lens having a numerical aperture of 0.85, it forms a light spot of approximately 0.405 μm in diameter. The optical disk 4 has a track pitch of 0.32 μm. The optical head controlling circuit 6 controls the position of a light spot formed by the optical head 5, and is capable of auto-tracking control, seek operation control, and auto-focusing control.

Figure 2:
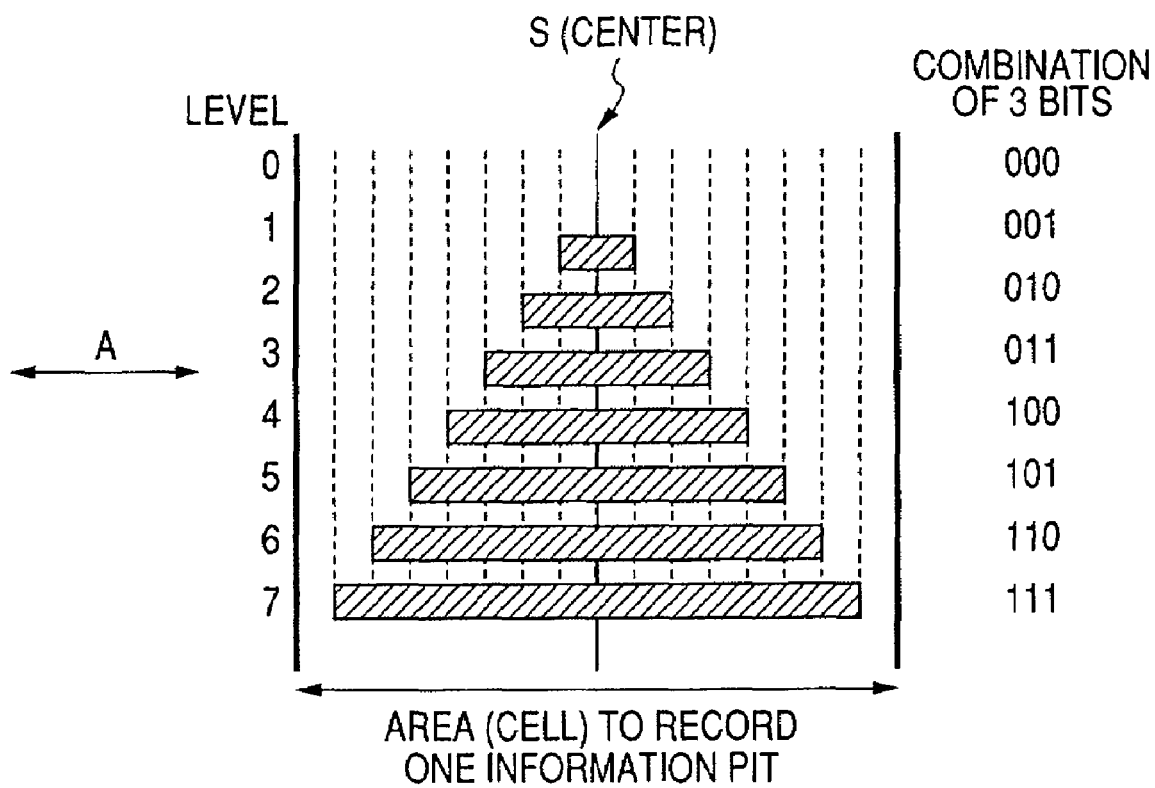
FIG. 2 is a diagram illustrating a width in a track direction which is varied to reflect differing levels of multi-level information pits according to the present invention, and combinations of 3 bits which correspond to the width variations.

FIG. 2 is a diagram illustrating a width in a track direction (direction indicated by an arrow A in the drawing) which is varied to reflect different levels of multi-level information pits used in a multi-level information recording/reproducing apparatus of the present invention. For the sake of convenience of explanation, an information pit's width in a direction perpendicular to the track direction is drawn smaller than the actual width.

In FIG. 2, an area sandwiched between two bold, solid lines represents a cell. The width of a cell is set to approximately 0.2 µm to obtain a surface density of about 30 G bit/inch$^2$, since the size of the light spot is approximately 0.405 µm and the track pitch of the optical disk is 0.32 µm in this embodiment. The following description is therefore given on the assumption that the cell width is 0.2 µm.

In this case, the smallest information pit (Level One) has a width of 25 nm, a Level Two information pit has a width of 50 nm, Level Three, 75 nm, Level Four, 100 nm, Level Five, 125 nm, Level Six, 150 nm, and Level Seven, 175 nm. At Level Zero, no information pit is recorded.

This method is for 8-level recording where three bits can be recorded in one cell. Each 3-bit information piece can be set to the eight levels as shown in FIG. 2, in which (0, 0, 0) corresponds to Level Zero, (0, 0, 1) to Level One, (0, 1, 0) to Level Two, (0, 1, 1) to Level Three, (1, 0, 0) to Level Four, (1, 0, 1) to Level Five, (1, 1, 0) to Level Six, and (1, 1, 1) to Level Seven. Of course, another corresponding method may be empolyed.

Figure 3:
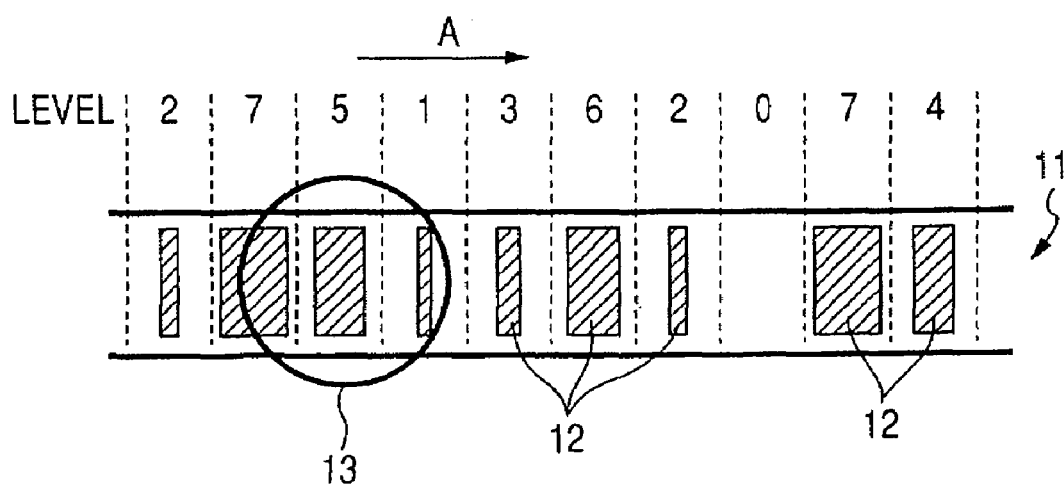
FIG. 3 is a schematic diagram showing, in relation to a light spot, information pits recorded at random on a track according to the present invention.

FIG. 3 is a schematic diagram showing random information pits 12 recorded along a track 11 on the optical disk 4 in relation to a light spot 13. In the case where a phase transition material is employed as a recording material in which recorded data can be erased, the shapes of information pits are varied to form a plurality of information pits of reproduction levels by irradiating the light spot 13 onto the optical disk 4, and adjusting the light amount and timing of each of a recording pulse, an erasing pulse, or a cooling pulse.

For the sake of convenience, information pits in FIG. 3 are given a rectangular shape and their widths are varied in width in the track direction. Information pits can have other shapes than the rectangular shape without altering the essence of the present invention, and may be, for example, circular, elliptic, or arrowhead marks as long as their surface areas correspond to the respective levels.

Other than phase transition materials, magneto-optical materials are also employable as a recording material in which recorded data can be erased. In this case, the shapes of the information pits are varied to form a plurality of information pits of reproduction levels through cooperation between the light spot and a magnetic field provided by a magnetic head (not shown) in the above-described multi-level information recording/reproducing apparatus.

Recording materials that allow add-on alone are also employable, and organic dyes or metal thin films can be used as such recording materials. In this case, the shapes of the information pits are varied to form a plurality of information pits of reproduction levels by radiating the light spot onto the optical disk 4, and adjusting the light amount and timing thereof. In the case where the optical disk 4 is a read-only recording medium, information pits can similarly be formed on the substrate as concave and convex shapes which is called phase pits, and the area of the phase pits or the optical depth of the phase pits is modulated to make multi-level recording possible.

The cell size needs to be reduced in order to obtain a larger storage capacity. When the cell size is small, two to three cells each holding an information pit are contained within the light spot 13 as shown in FIG. 3. The following description on the principle of this embodiment takes as an example a case of employing a phase transition material in such multi-level recording.

In FIG. 3, the direction of the arrow A indicates the track direction and the reference numeral 11 denotes the track on the optical disc 4 along which information pits are recorded. Regions sectioned off from one another by dashed-lines represent virtually set cells, where information pits denoted by numeral 12 and corresponding to levels that are shown in the upper part of FIG. 3 are recorded in accordance with the system as shown in FIG. 2. Numeral 13 denotes a light spot.

In this embodiment, the light spot is approximately 0.405 µm in diameter whereas the cell width is 0.2 µm. At this scale, the surface density is enhanced about 1.5 times the case of about 19.5 G bit/inch$^2$, which is a surface density obtained by the conventional, 2-level recording (e.g., 1-7 PP modulation, 2T=139 nm).

Described next is result of an optical simulation conducted to know how a signal is reproduced by this method.

Figure 4:
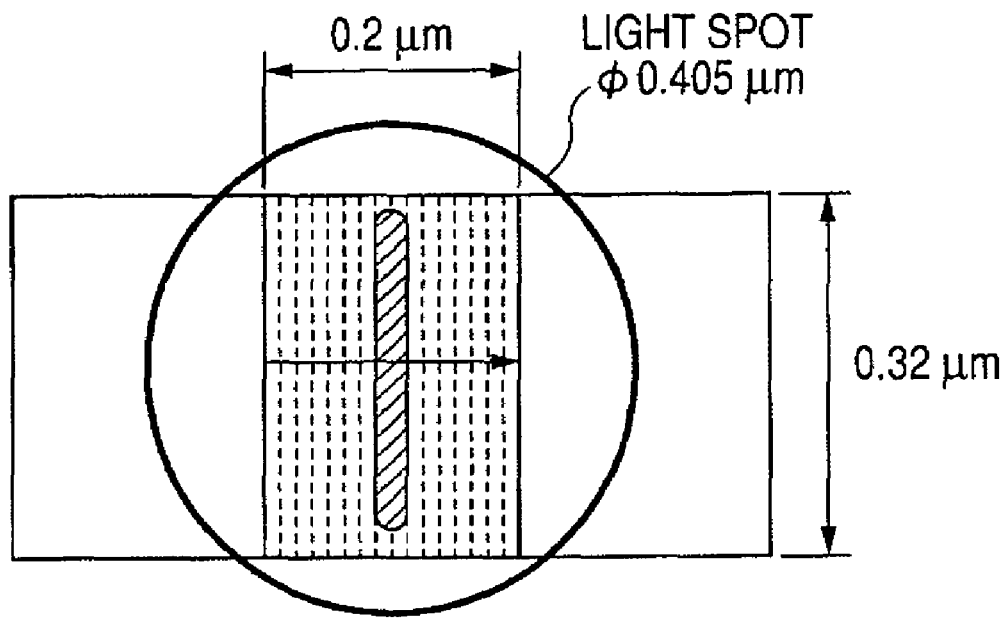
FIG. 4 is a diagram illustrating parameters of optical simulation for explaining a reproduction principle of the present invention.
Figure 5:
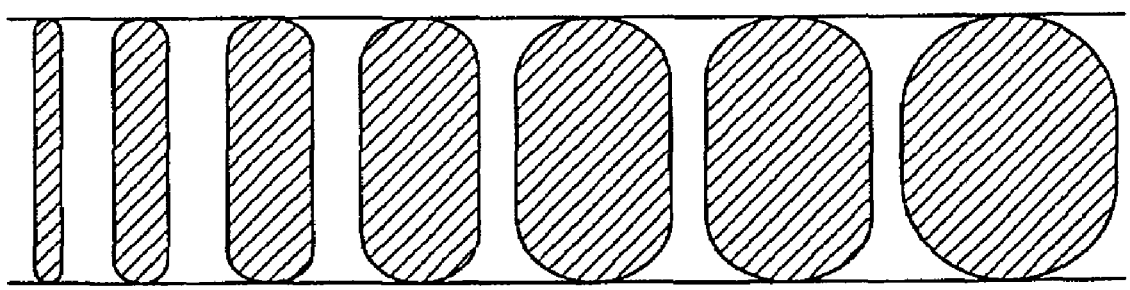
FIG. 5 is a diagram illustrating shapes that are given to information pits in the optical simulation for explaining the reproduction principle of the present invention.

FIG. 4 shows parameters used in the optical simulation. The track pitch is 0.32 µm, the light spot size is 0.405 µm (wavelength: 405 nm, numerical aperture of the object lens: NA=0.85), the cell size is 0.2 µm. Information pits are given shapes as shown in FIG. 2, and parameters as shown in FIG. 5 are given corresponding to the respective levels.

Figure 6:
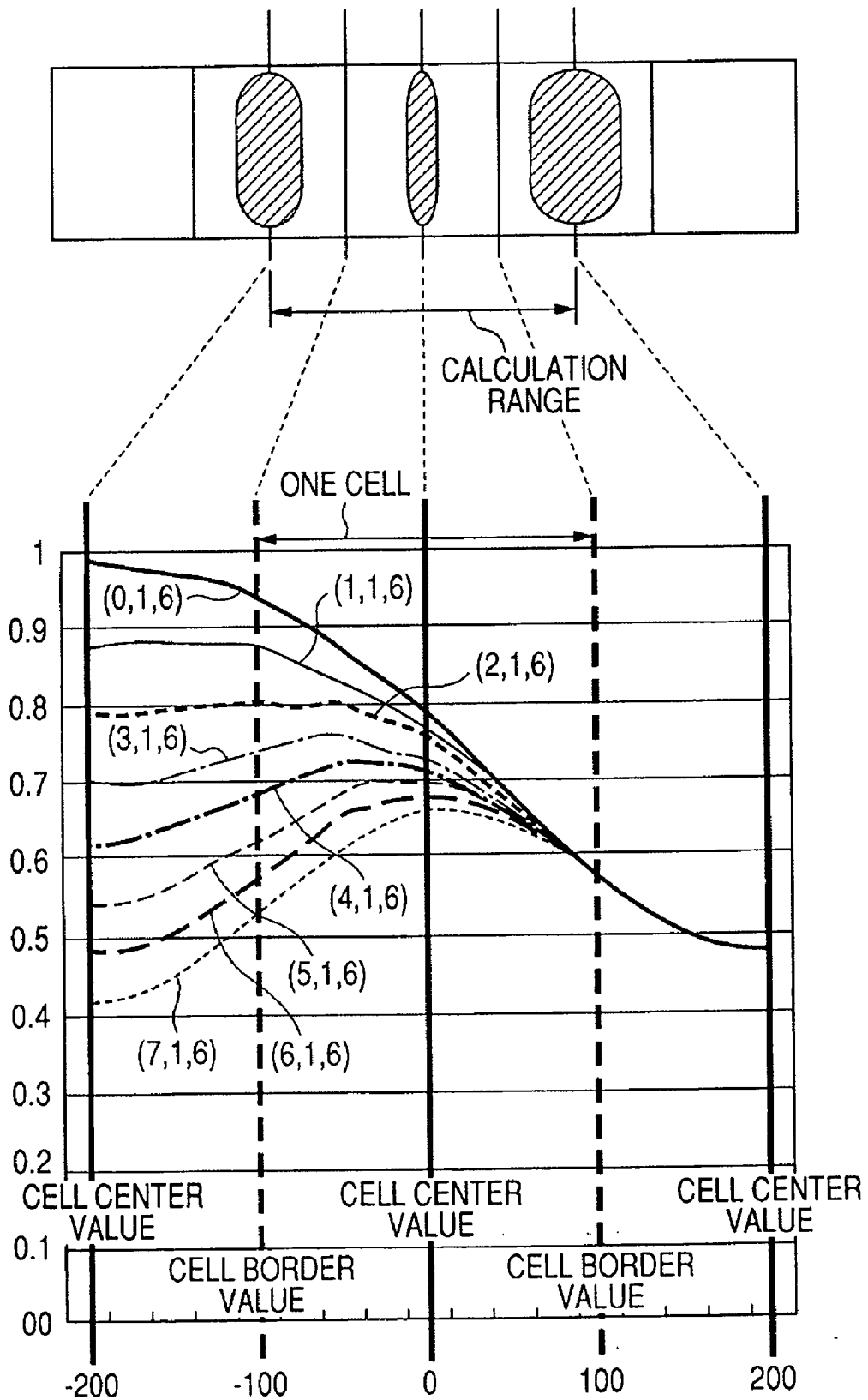
FIG. 6 is a diagram illustrating a signal reproduced from a combination of information pits that are written in three successive cells as a result of a calculation in the optical simulation for explaining the reproduction principle of the present invention.

In FIG. 6, each of three consecutive cells are each given the eight different levels so that the levels of the three cells is sequentially combined (8×8×8=512 combinations in total), and a reproduced signal (reflected light amount) obtained when the light spot is moved from the first cell center to the third cell center is calculated.

The lower part of FIG. 6 shows, as an example, out of 512 combinations of the cell levels, 8 combinations from (0, 1, 6) to (7, 1, 6) (other cells than these three cells are all set to Level Zero). The three bold lines in FIG. 6 are positioned to represent a reproduced signal obtained when the light spot is at the center of the respective cells (cell center value). Two dashed lines are positioned to represent a reproduced signal obtained when the light spot is at the border between one cell and its following cell (cell border value).

It is understood from FIG. 6 that, with these parameters, the cell center value of the middle cell corresponds to Level "1", but, as the left cell shifts from Level "0(zero)" to Level "7", fluctuates instead of remaining the same. The fluctuation is caused by inter-symbol interference. On the other hand, the center value of the right cell remains almost the same as that of the middle cell irrespective of the level of the left cell, as long as the cell center value of the middle cell corresponds to Level "1". In short, the cell center value of one cell is influenced by inter-symbol interference from cells on the right or left immediately adjacent to the one cell, but it is not influenced from the other cells on the outside of the light and left cells. This is also understood instinctively from FIG. 4 in which the edge of the light spot cast upon the middle cell falls on the cells on the right and left sides adjacent to the middle cell.

Figure 7:
FIG. 7 is a diagram showing a cell center value amplitude distribution based on optical system parameters of a multi-level information recording/reproducing apparatus according to the present invention.

FIG. 7 shows the amplitude distribution of a reproduced signal in a graph of which the horizontal axis represents the level of the middle cell in three consecutive cells for every combination of the levels of information pits recorded in the three consecutive cells (FIG. 7 employs standardization by the reflectance of a marked portion and an unmarked portion).

Figure 13:
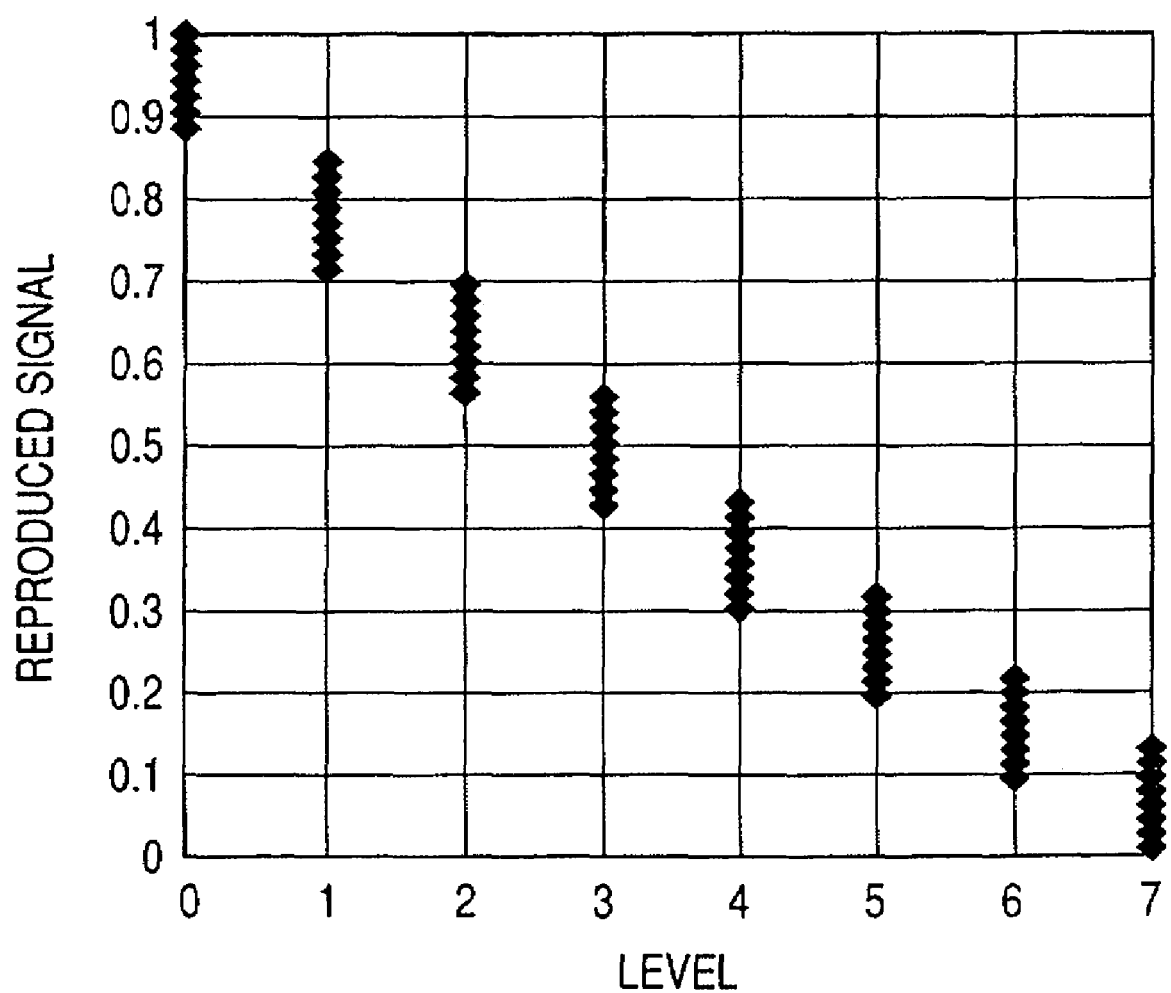
FIG. 13 is a diagram showing a cell center value amplitude distribution in the prior art.

The amplitude distribution of the reproduced signal shown in FIG. 7 has more overlapping between adjacent levels than the one shown in FIG. 13, and it is difficult to discriminate one level from another with a fixed threshold unless some measure is taken. A common measure is to make the amplitude distribution of the reproduced signal more separative by performing such signal processing as waveform equalization on the reproduced signal, and however such a measure has limits. Here, a description is given on a method of identifying the level of an information pit recorded in a cell by using the value of a reproduced signal at the border between the cell and the following cell (cell border value) which is less susceptible to inter-symbol interference.

Returning to FIG. 6, a closer examination of a reproduced signal at the border between neighboring cells (cell border value) reveals that the cell border value at the border between the right cell and the middle cell are almost the same. In other words, when the combination of the levels of the cells adjacent to each other across a border (in this example, a combination of Level "1" and Level "6") is the same, the cell border value is not influenced much by inter-symbol interference irrespective of the other cells on the outside of the adjacent cells (in this example, the left cell).

Figure 8:
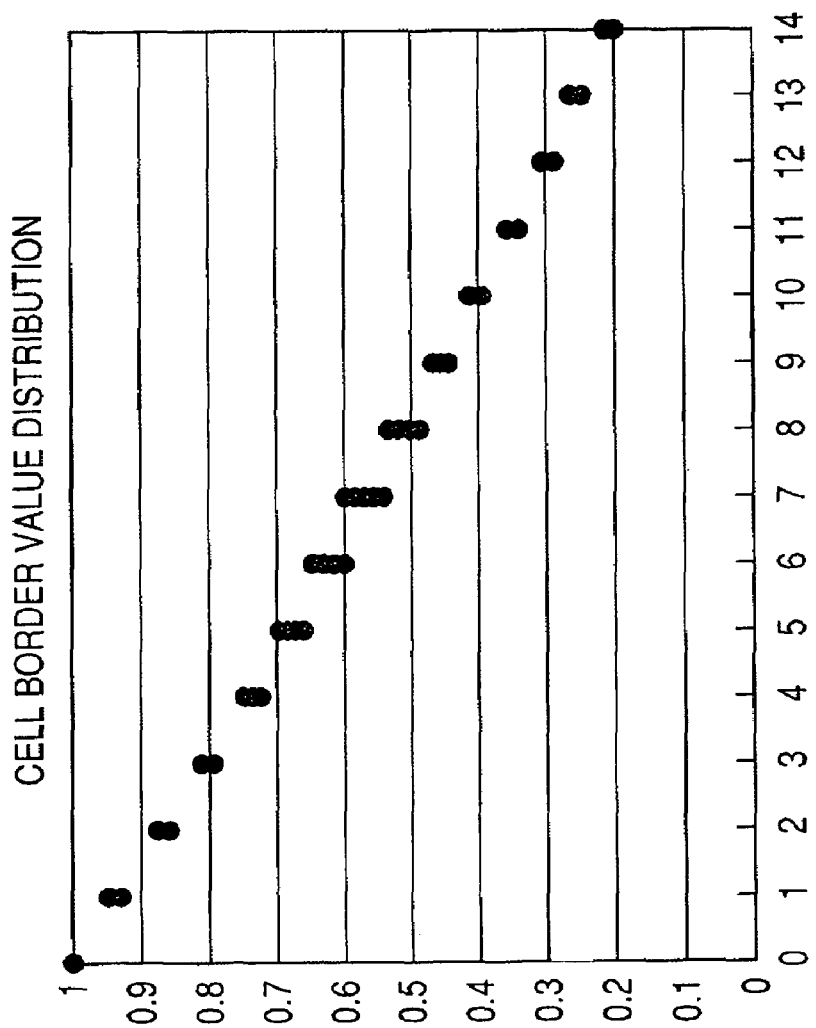
FIG. 8 is a diagram showing a cell border value amplitude distribution based on optical system parameters of a multi-level information recording/reproducing apparatus according to the present invention, and a combination of the levels of the left and right cells.

The left side of FIG. 8 shows the amplitude distribution of a reproduced signal of a cell border value for every combination of the levels of cells adjacent to each other (8×8=64 combinations in total) (FIG. 8 employs standardization by the reflectance of a marked portion and an unmarked portion). The horizontal axis of FIG. 8 represents the sum of the levels cells adjacent to each other, and it produces fifteen classification values from a 0 value=(0, 0) to a 14 value=(7, 7).

Without signal processing such as waveform equalization, it is clear from FIG. 8 that the distribution is separated into fifteen values from 0 to 14. The right side of FIG. 8 shows which combination of the levels of cells adjacent to each other corresponds to which of the fifteen values.

Thus, if the level of the preceding cell is known, the level of the following cell can be determined uniquely by detecting the cell border value. For instance, in the case where the preceding cell is known to be Level "3" and the cell border value is detected as "7", the level of the following cell is identified as "4" by a calculation 7−3=4. To generalize, this is expressed as X+Y=Z (or Z−X=Y) wherein "X" represents the level of the preceding cell (X is an integer that satisfies $0 \leq X \leq 7$), "Y" represents the level of the following cell (Y is an integer that satisfies $0 \leq Y \leq 7$), and "Z" represents the cell border value (Z is an integer that satisfies $0 \leq Z \leq 14$).

Figure 9:
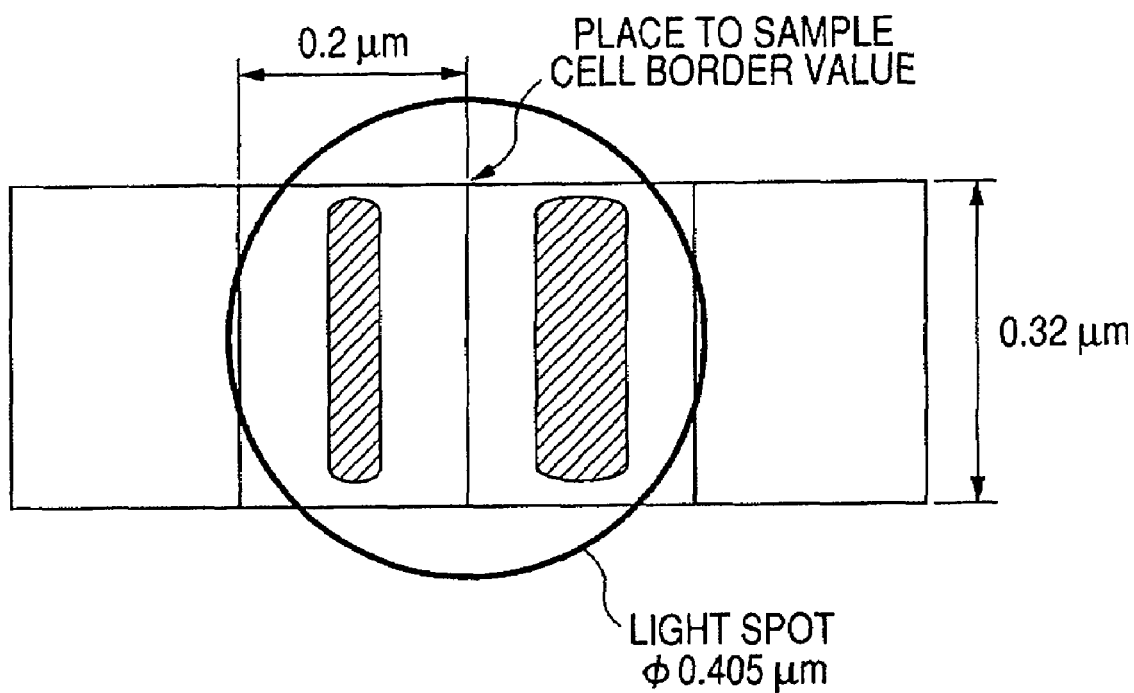
FIG. 9 is a diagram illustrating the positions of one cell and its following cell in relation to a light spot when a cell border value is sampled.

FIG. 9 shows a positional relation of cells adjacent to each other across a cell border at which the light spot is centered. While the light spot is 0.405 μm in diameter, the combined width of the two cells is 0.4 μm and most of the light spot falls on the cells adjacent to each other. It is instinctively understood from FIG. 9 that there is almost no influence from the other cells on the outside of the adjacent cells.

Figure 10:
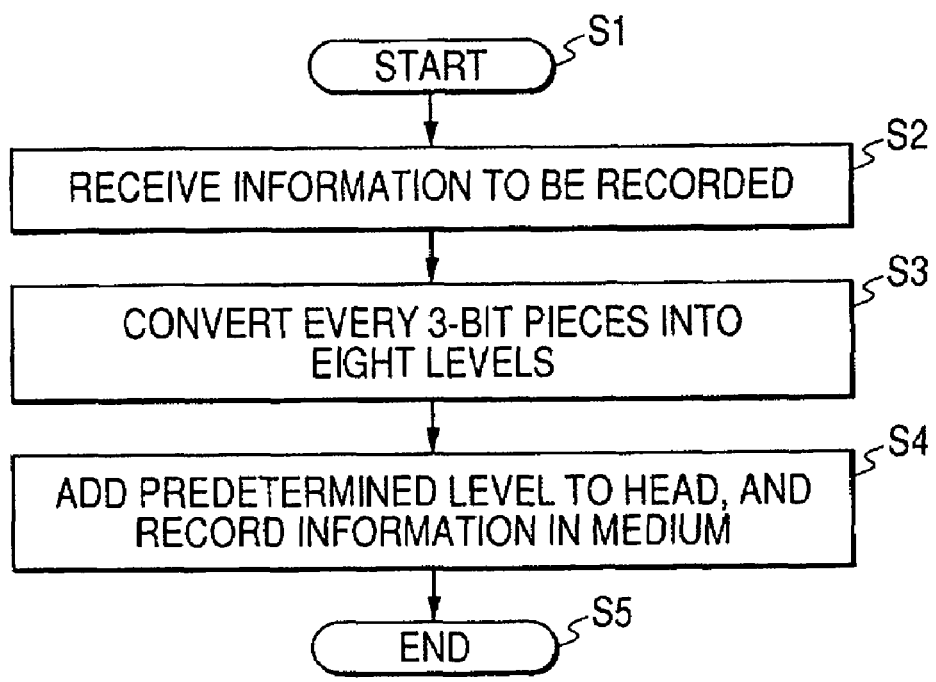
FIG. 10 is a flow chart illustrating how information is recorded by a multi-level information recording/reproducing apparatus according to the present invention.
Figure 11:
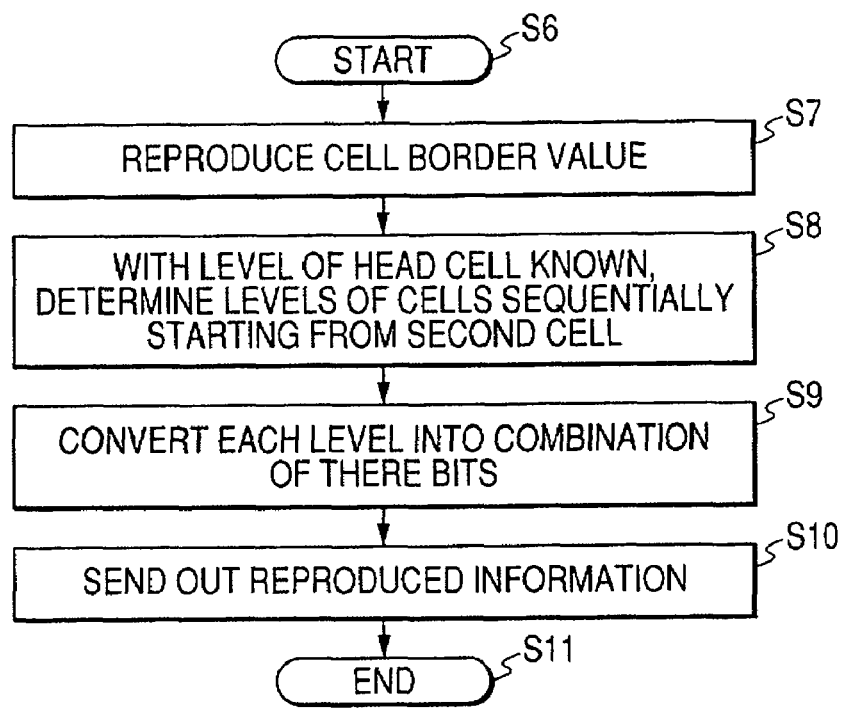
FIG. 11 is a flow chart illustrating how information is reproduced by a multi-level information recording/reproducing apparatus according to the present invention.

Described next with reference to FIGS. 10 and 11 are steps of recording and reproducing multi-level information by the above-described method of identifying a cell level from a cell border value which is less susceptible to inter-symbol interference. First, in order to record information, the multi-level information recording/reproducing apparatus 1 starts operation in Step S1 upon reception of a command of recording information, as shown in FIG. 10.

In Step S2, the interface controller 10 receives information sent to be recorded. In Step S3, the information to be recorded is converted into 8 levels every 3-bit pieces, as shown in FIG. 2 (in this case, the information may be modulated or an error correction code may be added to the information).

In Step S4, a level determined in advance (e.g., Level Zero) is added to the head of the string of 8-level information, and the multi-level information is recorded along a target track on the optical disk 4, which is an optical information medium, with the use of the optical head 5. After finishing the recording of all information to be recorded, the processing proceeds to Step S5 to complete the recording operation.

The thus recorded multi-level information is reproduced through steps described below with reference to FIG. 11. Receiving a command of reproducing information, the multi-level information recording/reproducing apparatus 1 starts operation in Step S6. In Step S7, the optical head 5 is used to sequentially read cell border values from a target track on the optical disk 4.

In Step S8, with using the reproduced cell border values, the levels of the cells are sequentially identified, in this example, since the head cell is known to be Level Zero, the level of the second cell is firstly identified, based on the association between a cell border value and a combination of the levels of preceding and following cells which is shown in FIG. 8.

In Step S9, the identified level of each cell is converted into 3-bit information in accordance with the association between levels and combinations of three bits which is shown in FIG. 2 (error correction or demodulation may be performed in Step S9).

In Step S10, the read reproduced information is sent out via the interface controller 10. After every piece of the reproduced information is sent out, the processing proceeds to Step S11 to complete the reproducing operation.

It is understood from the above description that the use of a cell border value which is less susceptible to inter-symbol interference facilitates reproduction of multi-level information.

A level determined in advance is recorded at the head cell in Step S4 of FIG. 10. In the case where information (or modulated information) to be recorded has consecutive cells of Level Zero or consecutive cells of Level Seven, the level of adjacent cells across a cell border is determined one-to-one by reproducing the cell border value as can be seen in FIG. 8. From the obtained cell border value, all values can be identified.

However, when noise or the like causes reading error to generate only a few places where information that is determined one-to-one is recorded, the error could be propagated. Therefore, more precise recording and reproduction of multi-level information is achieved by recording information (multi-level information pits) of a predetermined level every a fixed number of cells.

Second Embodiment

Figure 12:
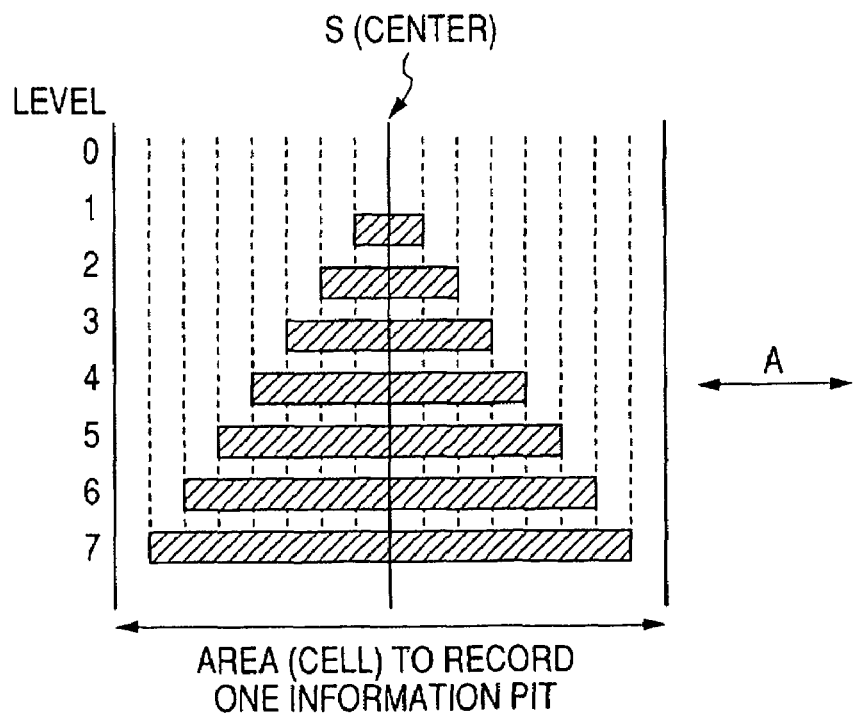
FIG. 12 is a diagram illustrating a width in a track direction which is varied to reflect differing levels of multi-level information pits according to prior art.
Figure 14:
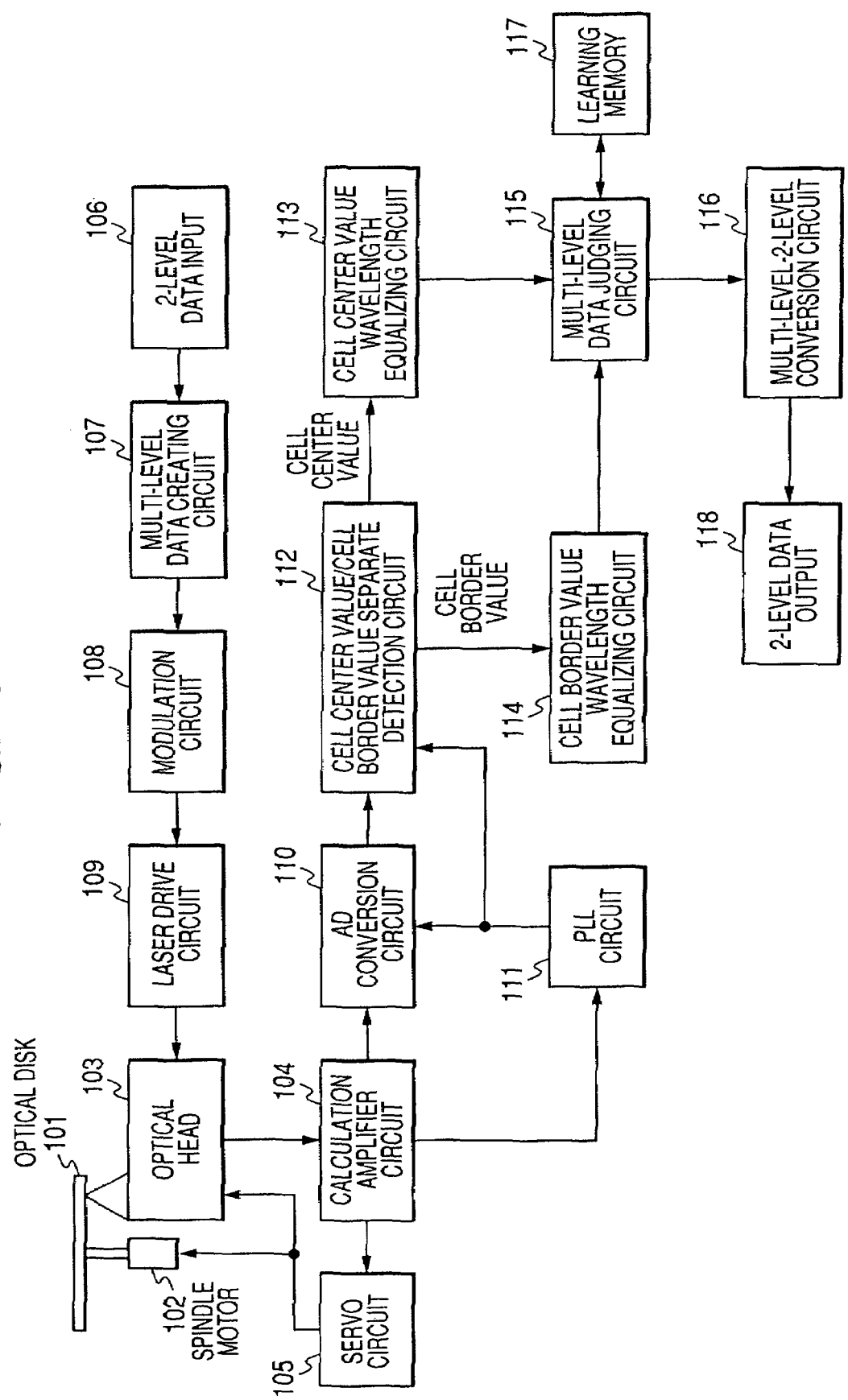
FIG. 14 is a block diagram showing a second embodiment of a multi-level information recording/reproducing apparatus according to the present invention.

A detailed description will be given on a second embodiment of the present invention with reference to the drawings. FIG. 14 is a schematic block diagram showing a multi-level information recording/reproducing apparatus according to the second embodiment. In FIG. 14, numeral 101 denotes an optical disk which is an information recording medium with a helical or concentric track formed thereon, and numeral 102 denotes a spindle motor which drives and turns the optical disk 101. On the optical disk 101, cells are virtually set in the direction of the track at constant intervals as described above with reference to FIG. 12, and multi-level information is recorded and reproduced in cells by varying the information pit width (or information pit area).

Numeral 103 denotes an optical head for recording or reproducing multi-level information on the optical disk 101. The optical head 103 collects laser light through an object lens from a semiconductor laser serving as a light source, and irradiates a light spot on the optical disk 101. Reflected light of the light spot from the optical disk 101 is detected by a photodetector in the optical head 103, and is sent to an operational amplifier circuit 104.

The caluculation amplifier circuit 104 processes a signal from the photodetector of the optical head 103, thereby detecting a focus error signal/tracking error signal for controlling the light spot so that the light spot is scanned along a desired track on the optical disk 101. Based on the detected error signal, a servo circuit 105 controls a focus actuator/tracking actuator in the optical head 103 to carry out focus control and tracking control. The servo circuit 105 also controls the spindle motor 102 to control the rotation of the optical disk 101 at a fixed linear velocity, a fixed angular velocity, or the like.

In the case of recording multi-level information on the optical disk 101, a 2-level data input 106 is converted into multi-level data by a multi-level data creating circuit 107, and a modulation circuit 108 outputs a signal corresponding to the multi-level data. A laser drive circuit 109 drives the semiconductor laser in the optical head 103 in accordance with the output signal to record a mark in accordance with the multi-level information on the track of the optical disk 101.

In the case of reproducing multi-level information, the optical head 103 irradiates the optical disk 101 with a light spot for reproduction, and the photodetector receives reflected light of the light spot. The detection signal is processed by the calculation amplifier circuit 104, and a signal obtained by the signal processing is converted into a digital signal by an AD conversion circuit 110. The digital signal is divided into a cell center value and a cell border value by a cell center value/cell border value separate detection circuit 112.

The series of processing is carried out with the use of clocks created by a PLL circuit 111. The cell center value separated by the cell center value/cell border value separate detection circuit 112 is subjected to waveform equalization processing which is performed by a cell center value waveform equalizing circuit 113, whereas the detected cell border value is subjected to waveform equalization processing which is performed by a cell border value waveform equalizing circuit 114. Reference values of learning table data are read out of a learning memory 117, and a multi-level data judging circuit 115 identifies the multi-level based on the cell center value and cell border value as will be described later. The multi-level data is converted into 2-level data by a multi-level-2-level conversion circuit 116, and the 2-level data is outputted as a 2-level output 118.

A method of reproducing multi-level information will be described below in detail. As mentioned above, the cell center value/cell border value separate detection circuit 112 detects and separates a sampled digital signal to a cell center value and a cell border value. Now, a description is given with reference to FIGS. 15 and 16 on different sampling positions of the cell center value and the cell border value as well as characteristics of the cell center value and the cell border value.

Figure 15:
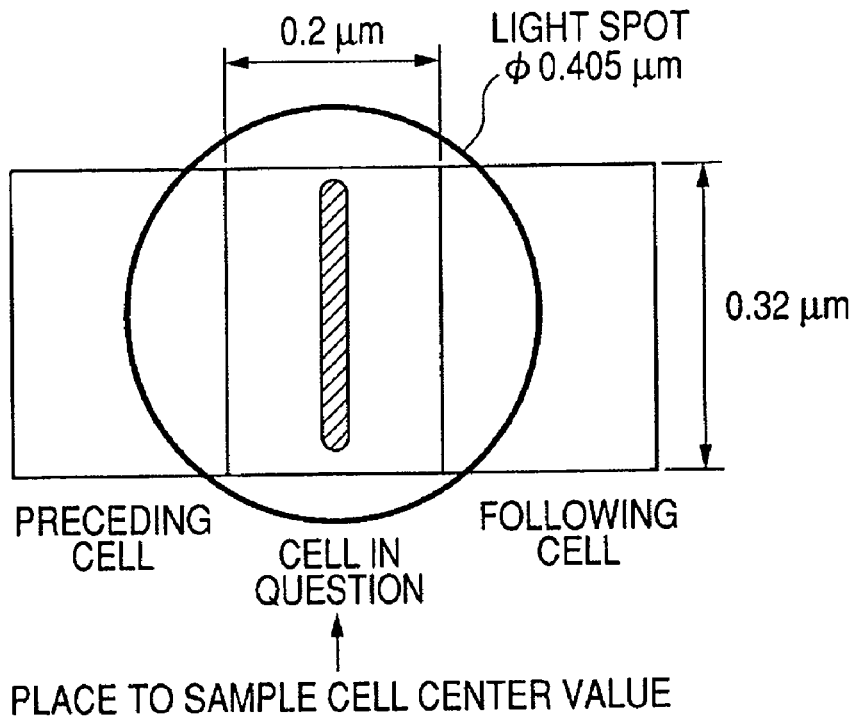
FIG. 15 is a diagram illustrating the positions of one cell and its following cell in relation to a light spot when a cell center value is sampled.

FIG. 15 shows, in relation to a light spot, the positions of the preceding and following cells when a cell center value is sampled. As an example, the track pitch is set to 0.32 μm, the light spot size is set to 0.405 μm (wavelength: 405 nm, numerical aperture of the object lens: NA=0.85), and the cell size is set to 0.2 μm. It has been found through experiments that, under these parameters, the cell center value of a cell in question is fluctuated, instead of remaining the same, by inter-symbol interference as the levels of its preceding and following cells shift between Level "0" and Level "7".

This is also understood instinctively from FIG. 15 where the edge of the light spot irradiated upon the middle cell falls on the right and left cells adjacent to the middle cell. The influence of inter-symbol interference to the cell center value increases as the cell size becomes smaller relative to the light spot size.

Figure 16:
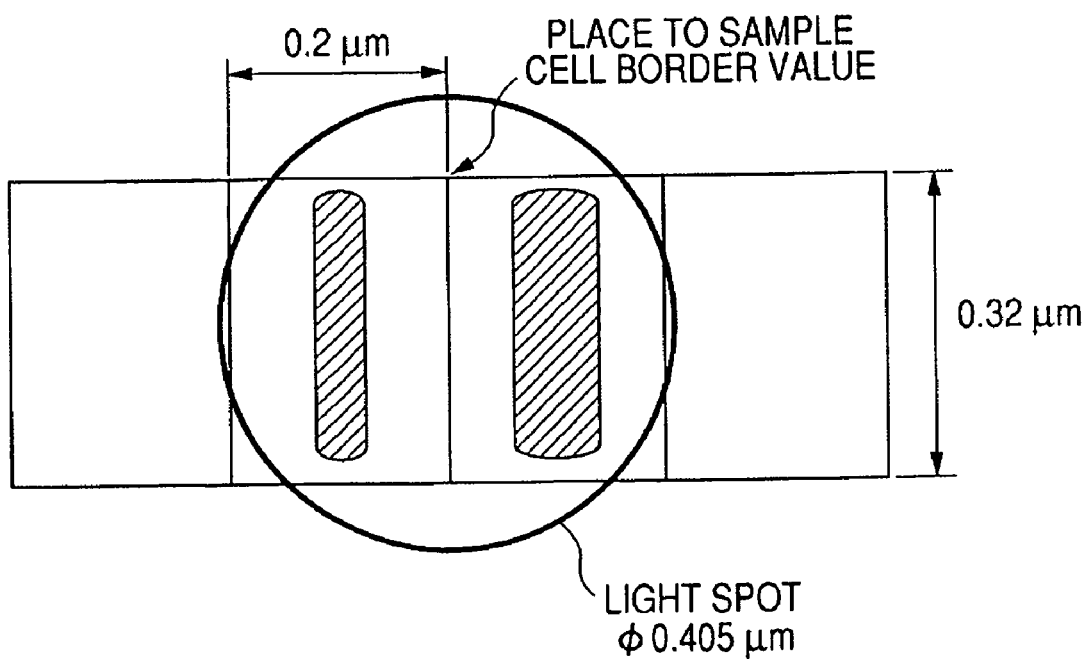
FIG. 16 is a diagram illustrating the positions of one cell and its following cell in relation to a light spot when a cell border value is sampled.

FIG. 16 shows a positional relation of cells adjacent to each other when a light spot moves to a cell border in sampling of a cell border value. While the light spot is 0.405 μm in diameter, the combined width of the two cells is 0.4 μm and most of the light spot falls on the cells adjacent to each other. In short, a cell border value sampled at the cell border between cells adjacent to each other is hardly affected by cells other than the adjacent cells on the right and left sides, which means that the influence of inter-symbol interference from the outside of the adjacent cells on the right and left sides is small.

The cell center value and the cell border value as those described above are obtained by separate sampling conducted in the cell center value/cell border value separate detection circuit 112 with the use of clocks which are generated in the PLL circuit 111 and are in sync with multi-level data. Clocks for cell center value sampling and clocks for cell border value sampling have the same frequency but their phases are different from each other by ½ cycle (one cell makes one cycle).

Thereafter, a reproduced signal of the cell center value and a reproduced signal of the cell border value are subjected to waveform equalization by the cell center value waveform equalizing circuit 113 and by the cell border value waveform equalizing circuit 114, respectively. The cell center value waveform equalizing circuit 113 is described first. The cell center value waveform equalizing circuit 113 suppresses inter-symbol interference exerted, from information pits marked in front of and behind the information pit in question, on a reproduced signal of an information pit in question. An example of showing an effect obtained by suppressing inter-symbol interference is described with reference to FIGS. 17A and 17B.

Figure 17A:
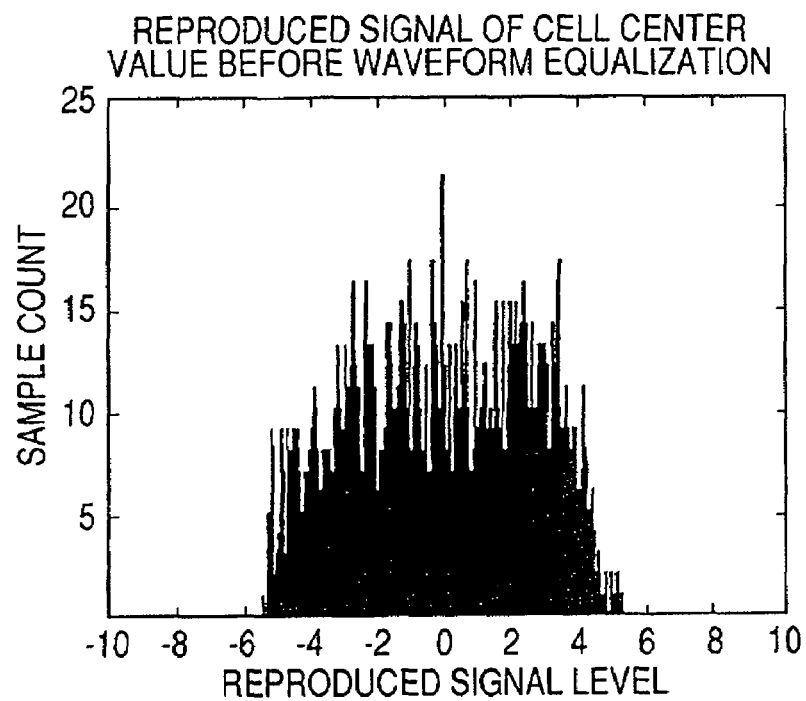
FIGS. 17A and 17B are simulation result diagrams showing histograms of reproduced signal levels which are obtained from cell center values before and after waveform equalization in reproducing 8-level data, respectively.
Figure 17B:
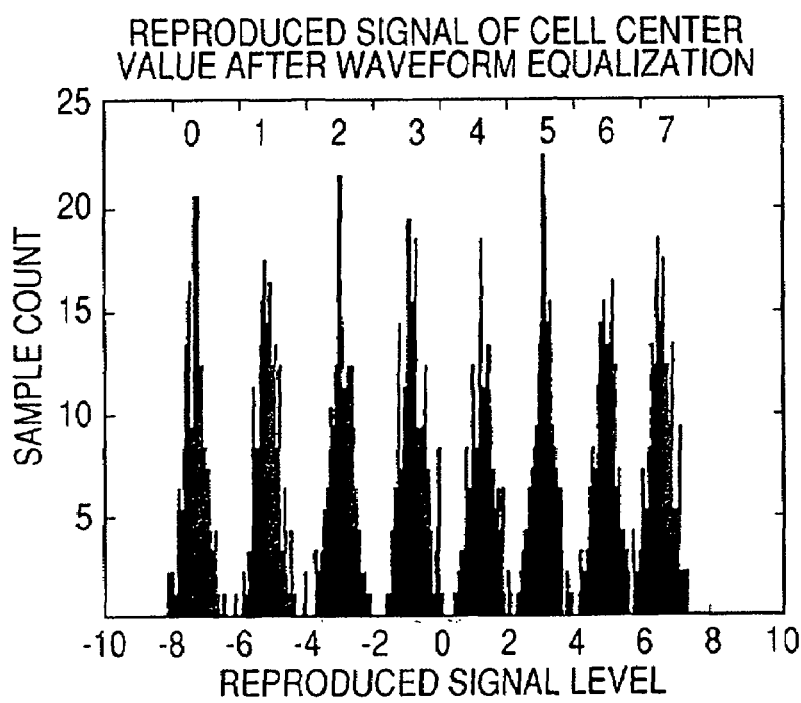

FIGS. 17A and 17B show simulation results in histograms of the level of a signal reproduced from a cell center value before and after waveform equalization in the case of reproducing 8-level data that is recorded by using a blue-violet light source (405 nm) and an optical system having an NA of 0.85, and by setting the size of a cell, which is virtually set to store one information pit on an optical disk having a track pitch of 0.32 μm, to 0.20 μm. FIG. 17A shows the reproduced signal of the cell center value before waveform equalization, and FIG. 17B shows the reproduced signal of the cell center value after waveform equalization. As is understood from FIGS. 17A and 17B, the reproduced signal is separated into Level "0" to Level "7", and is thus readily detected as multi-level data.

The cell border value waveform equalizing circuit 114 is described below. The cell border value waveform equalizing circuit 114 suppresses inter-symbol interference exerted on a cell border value at the cell border between adjacent cells from information pits written in the other cells on the outside of the adjacent right and left cells. As in the description of the cell center value, an example of showing an effect obtained by suppressing inter-symbol interference from affecting the cell border value is described with reference to FIGS. 18A and 18B.

Figure 18A:
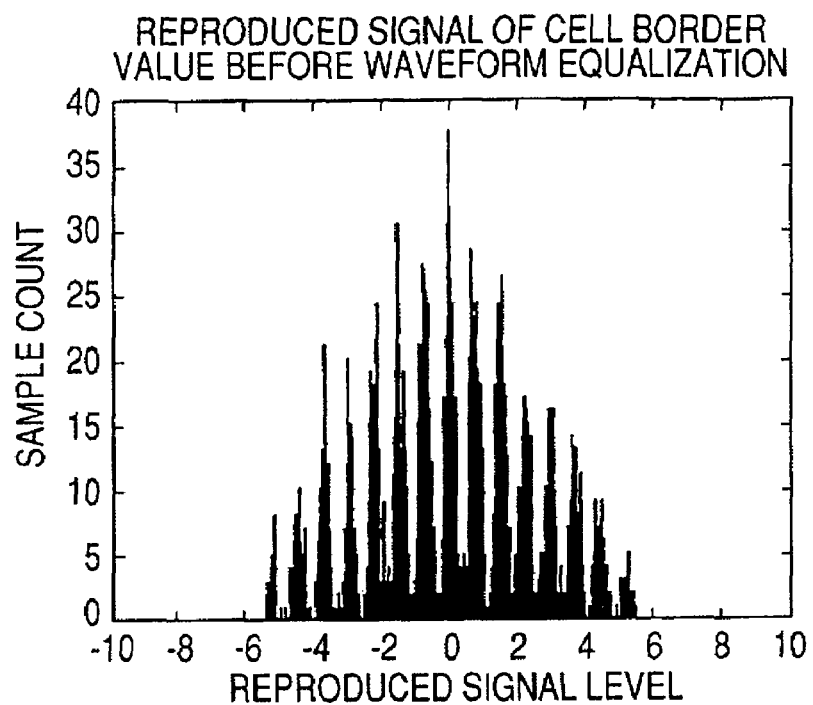
FIGS. 18A and 18B are simulation result diagrams showing histograms of reproduced signal levels which are obtained from cell border values before and after waveform equalization, respectively.
Figure 18B:
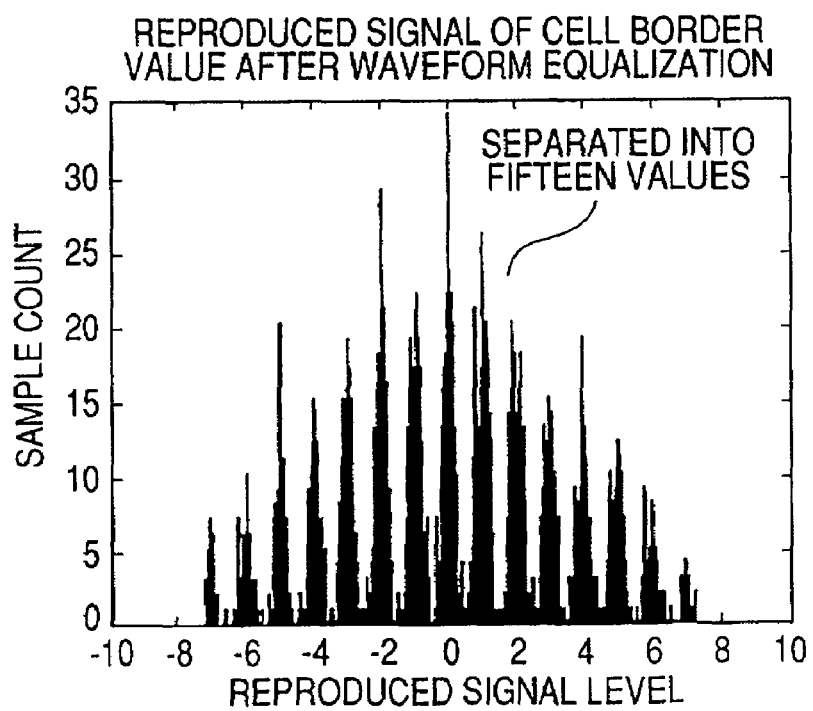

FIGS. 18A and 18B show simulation results in histograms of the level of a signal reproduced of a cell border value before and after waveform equalization, and the same parameters as in FIGS. 17A and 17B have been employed in the calculation. FIG. 18A shows the reproduced signal of the cell border value before waveform equalization, and FIG. 18B shows the reproduced signal of the cell border value after waveform equalization. As is understood from FIGS. 18A and 18B, the reproduced signal of the cell border value is separated into fifteen values of from 0 to 14 without signal processing such as waveform equalization, though waveform equalization can make the reproduced signal more separative. The reproduced signal here is separated into fifteen values because the cell border value remains the same as long as the sum of the levels of two adjacent cells is the same.

This will be described with reference to FIG. 19. FIG. 19 is a diagram showing a value at a cell border in association with a combination of the levels of cells on the right and left across the cell border. While there are 8×8=64 combinations of the levels of the cells adjacent to each other, a reproduced signal of a cell border value can take fifteen values. In short, the levels of left and right cells combined equal the value of the cell border value.

Thus, if the multi-level of the preceding cell is known, the level of the following cell can be determined one-to-one by detecting the cell border value. For instance, in the case where the preceding cell is known to be Level "3" and the cell border value is detected as a "7", the level of the following cell is identified as "4" by a calculation of 7−3=4. Generally, this is expressed as X+Y=Z (or Z−X=Y) wherein "X" represents the level of the preceding cell (X is an integer that satisfies $0 \leq X \leq 7$), "Y" represents the level of the following cell (Y is an integer that satisfies $0 \leq Y \leq 7$), and "Z" represents the cell border value (Z is an integer that satisfies $0 \leq Z \leq 14$).

After the cell center value and the cell border value are subjected to waveform equalization in this manner, the multi-level data judging circuit 115 outputs multi-level data as the result of judgment, the multi-level-2-level conversion circuit 116 converts the multi-level data into 2-level data, and the 2-level data is outputted.

Figure 20:
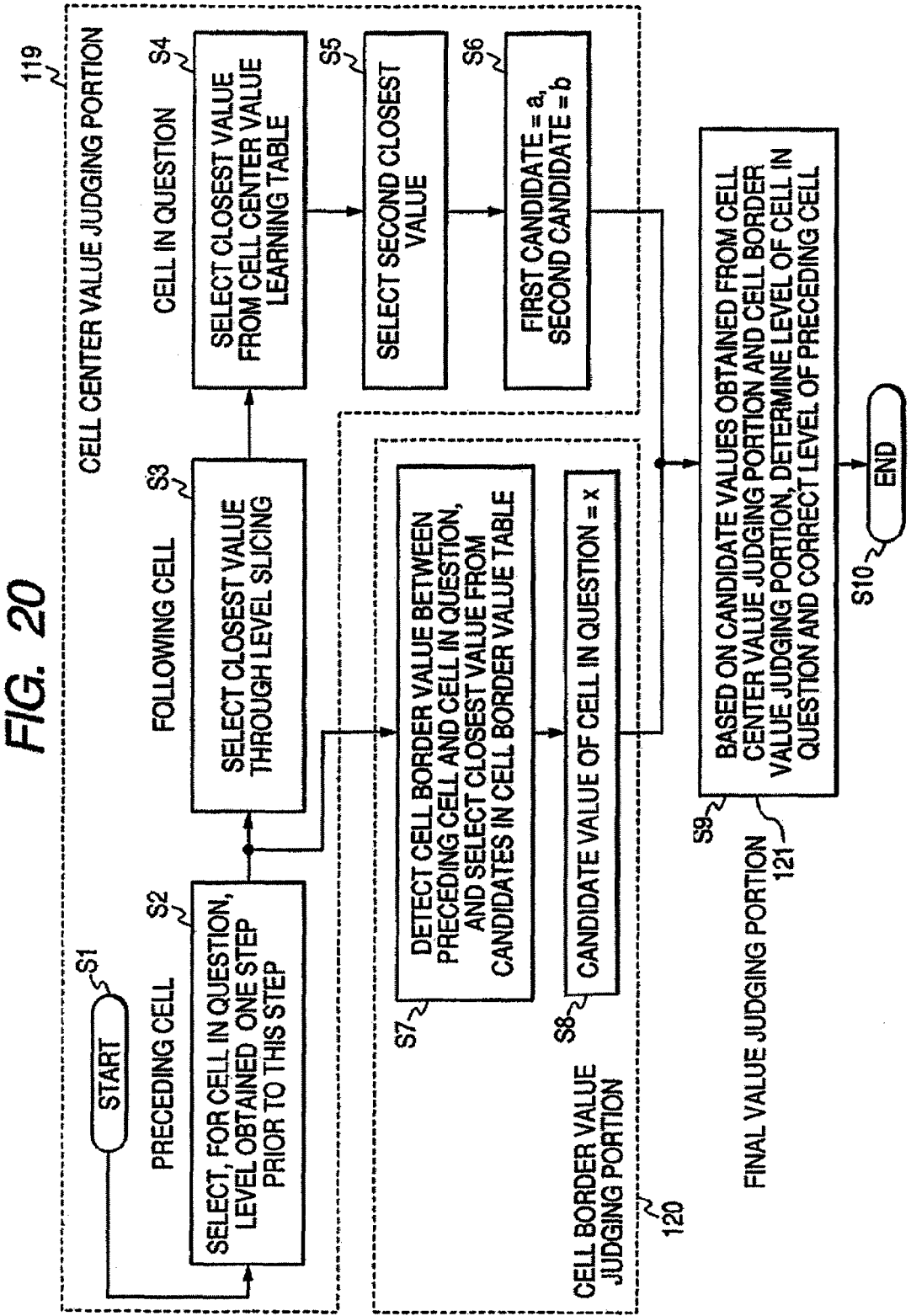
FIG. 20 is a diagram illustrating a method of judging multi-level data in a multi-level data judging circuit.

A method of judging multi-level data in the multi-level data judging circuit 115 will be described below in detail with reference to FIGS. 20 to 26. Data to be reproduced in this embodiment is 8-level data of Level "0" to Level "7". FIG. 20 is a diagram illustrating a method of judging multi-level data in the multi-level data judging circuit 115. The multi-level data judging circuit 115 is roughly divided into a cell center value judging portion 119, a cell border value judging portion 120, and a final value judging portion 121.

The cell center value judging portion 119 is described first. The cell center value judging portion 119 identifies a cell center value when there are three consecutive cells (a preceding cell, a cell in question, and a following cell) as those described with reference to FIG. 15. At an input of a reproduced signal of a cell center value, the multi-level data judging circuit 115 starts operation in Step S1.

In Step S2, the level of the preceding cell is determined (the level of the cell in question which is obtained in one step prior to this step is selected). For instance, when the level of the cell in question which is obtained in one step prior to Step S2 is Level "7", Level "7" is selected (temporarily, not as final decision) as the level of the preceding cell. Alternatively, a level is selected for the preceding cell by level-slicing a reproduced signal of a cell center value (a sampling value when the light spot is positioned at the center of the preceding cell) with the use of a plurality of thresholds corresponding to the respective levels.

In Step S3, a level is selected for the following cell by level-slicing a reproduced signal of a cell center value (a sampling value when the light spot is positioned at the center of the following cell) (the closest level obtained by the level slicing is selected). For example, Level "7" is selected as the level of the following cell. Of the three consecutive cells, the levels of the preceding cell and the following cell have now been selected.

In Step S4, the levels of the preceding cell and the following cell are used to select the level of the cell in question closest to the reproduced signal of the cell center value from a cell center value learning table (FIG. 21A). In Step S5, a second-closest value is selected. In Step S6, the values selected in Steps S4 and S5 are set as a first candidate "a" and a second candidate "b", respectively.

Steps S4 to S6 executed by the cell center value judging portion 119 are described in more detail with reference to FIG. 21A and FIG. 22. FIGS. 21A and 21B show learning tables for use in judging multi-level data. FIG. 21A shows a cell center value learning table, which has entries for all of the 512 (8×8×8) combinations of the preceding cell, the cell in question, and the following cell. Information of the 512 combinations is recorded at the head of a user data region on the optical disk 101, so that a reproduced signal of a cell center value of the cell in question is detected for each of the 512 combinations before information in the user data region is reproduced. The sampling value of the detected signal is stored as a reference value in the learning memory 117.

Figure 22:
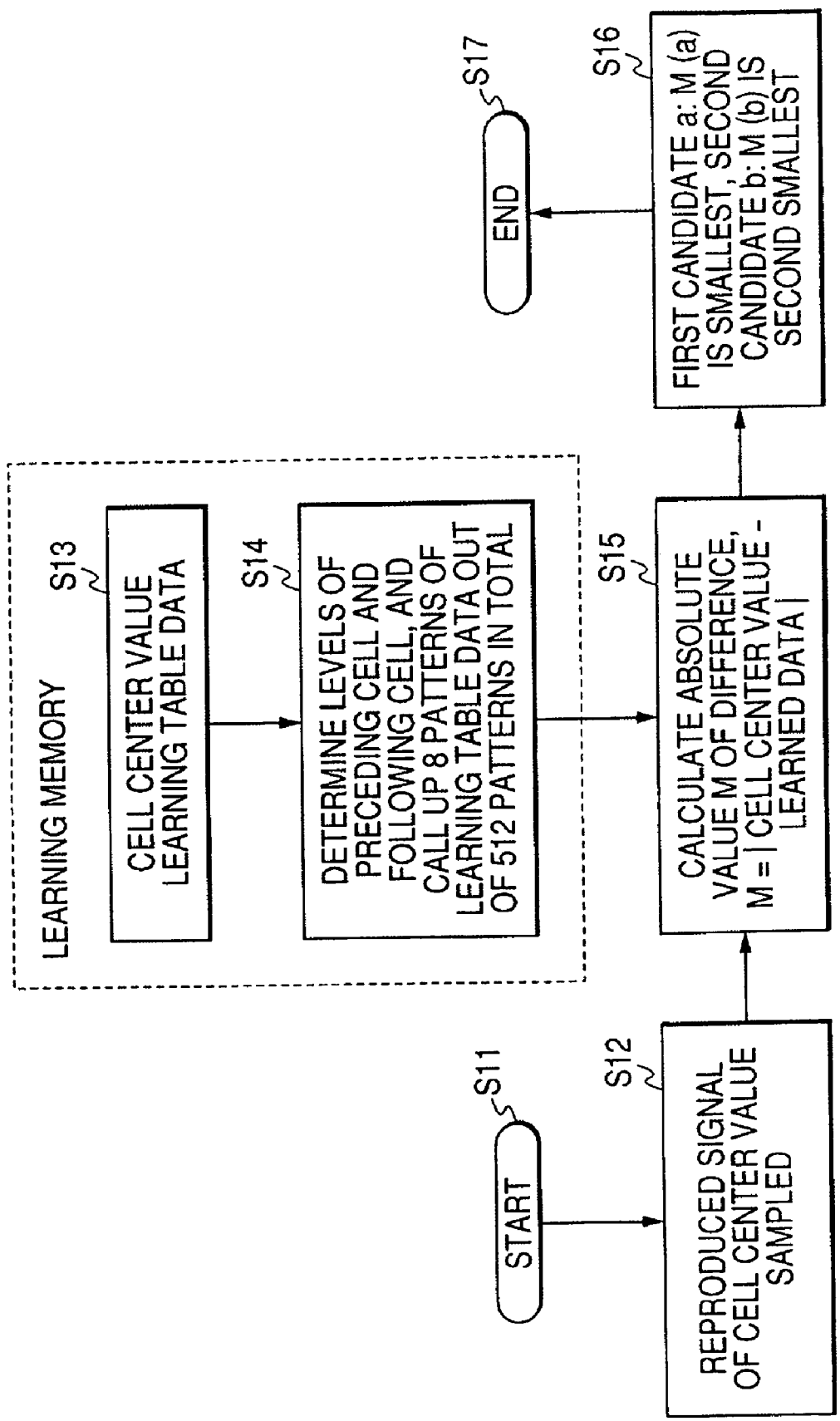
FIG. 22 is a diagram illustrating a method of determining a candidate value for a cell in question with the use of the cell center value learning table of a cell center value judging portion as shown in FIG. 20.

With reference to FIG. 22, a method of determining candidate values for the cell in question with the use of the cell center value learning table by the cell center value judging portion 119 in Steps S4 to S6 in FIG. 20 is described below. First, operation is started in Step S11. In Step S12, reproduced signals of cell center values sampled are sequentially inputted to the cell center value judging portion 119. In Step S13, the learning memory 117 is accessed and, in Step S14, reference values obtained from the cell center value learning table of FIG. 21A every time of a cell center value being inputted are sequentially read out of the learning memory 117.

Since Level "7" is selected as the level for the preceding cell and as the level for the following cell (see the description of FIG. 20), The entries read here are for 8 combinations, namely, (7, 0, 7) to (7, 7, 7), out of the 512 combinations in total. In Step S15, the absolute values of the differences between cell center values and reference values for the 8 combinations are calculated and set as M values. In Step S16, the obtained eight M values are compared, and when the level of the cell in question is "a" that produces the smallest M value (this value is denoted by M(a)), "a" is determined as a first candidate value in the cell center value judging portion 119.

Then, when the level of the cell in question is "b" that produces the second smallest M value (this value is denoted by M(b)), "b" is determined as a second candidate value in the cell center value judging portion 119. Thereafter, the processing proceeds to Step S17, where the operation is ended. The above description relates to the cell center value judging portion 119.

Figure 23:
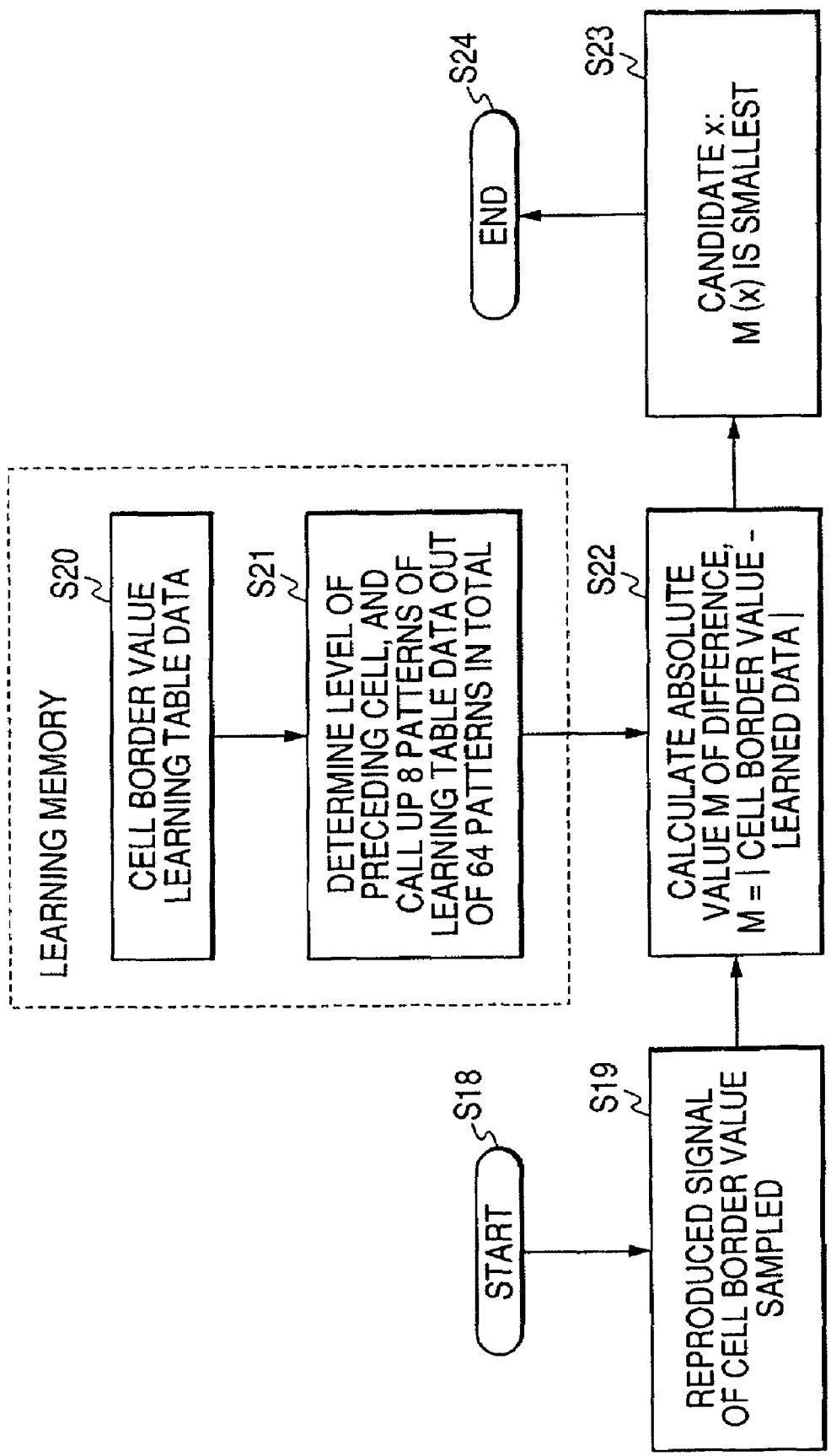
FIG. 23 is a diagram illustrating a method of determining a candidate value for a cell in question with the use of the cell border value learning table of a cell border value judging portion as shown in FIG. 20.

With reference to FIG. 21B and FIG. 23, a method of determining the level of the cell in question is determined by the cell border value judging portion 120 in FIG. 20 will be described below in detail. As shown in FIG. 20, the cell border value judging portion 120 uses the level of the preceding cell which is determined in Step S2 to select, in Step S7, the cell in question, a value closest to a reproduced signal of a cell border value from a cell border value learning table (FIG. 21B). In Step S8, the value selected in Step S7 is set as a candidate value "x".

Steps S7 and S8 executed by the cell border value judging portion 120 are described in more detail with reference to FIG. 21B and FIG. 22. FIG. 21B shows a cell border value learning table, which has entries for all of the 64 (8×8) combinations of the preceding cell and the cell in question. Information of the 64 combinations is also recorded at the head of a user data region on the optical disk 1, so that a reproduced signal of a cell border value of the cell in question is detected for each of the 64 combinations before information in the user data region is reproduced. The sampling value of the detected signal is stored as a reference value in the learning memory 117.

With reference to FIG. 23, a method of determining candidate values of the cell in question with the use of the cell-border value learning table by the cell border value judging portion 120 in Steps S7 and S8 of FIG. 20. First, operation is started in Step S18. In Step S19, reproduced signals of cell border values sampled are sequentially inputted to the cell border value judging portion 120. In Step S20, the learning memory 117 is accessed and, in Step S21, reference values obtained from the cell center value learning table of FIG. 21B very time of a cell border value being inputted are sequentially read out of the learning memory 117.

Since Level "7" is selected as the level for the preceding cell (see the description of FIG. 20), the entries read here are for 8 combinations, namely, (7, 0) to (7, 7), out of the 64 combinations in total. In Step S22, the absolute values of the differences between cell border values and reference values for the 8 combinations are calculated and set as M values. In Step S23, the obtained eight M values are compared, and when the level of the cell in question is "x" that produces the smallest M value (this value is denoted by M (x)), "x" is determined as a candidate value in the cell border value judging portion 120. Thereafter, the processing proceeds to Step S24, where the operation is ended. The above description relates to the cell border value judging portion 120.

Figure 24:
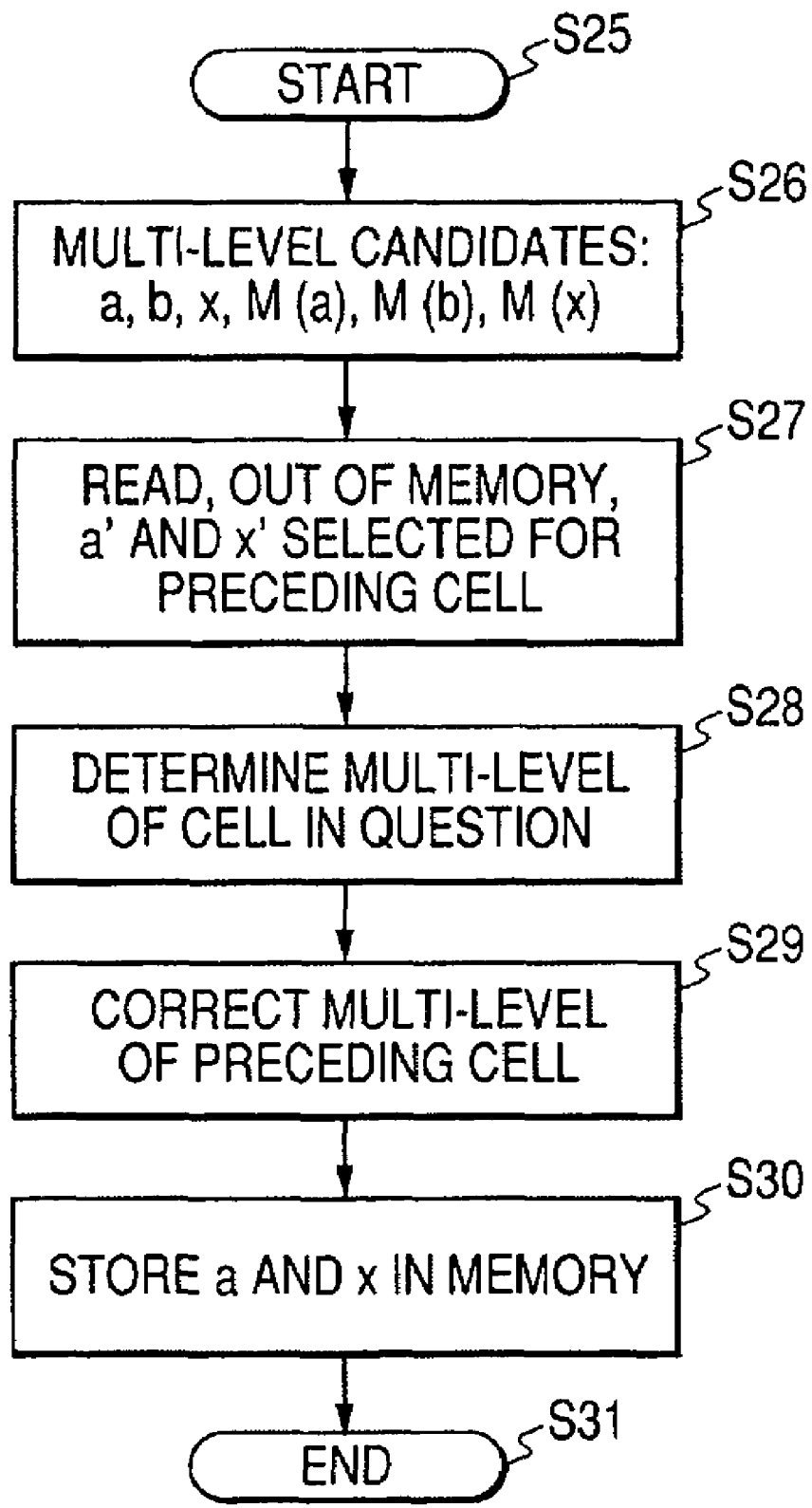
FIG. 24 is a diagram illustrating an algorithm of a final value judging portion as shown in FIG. 20.
Figure 25:
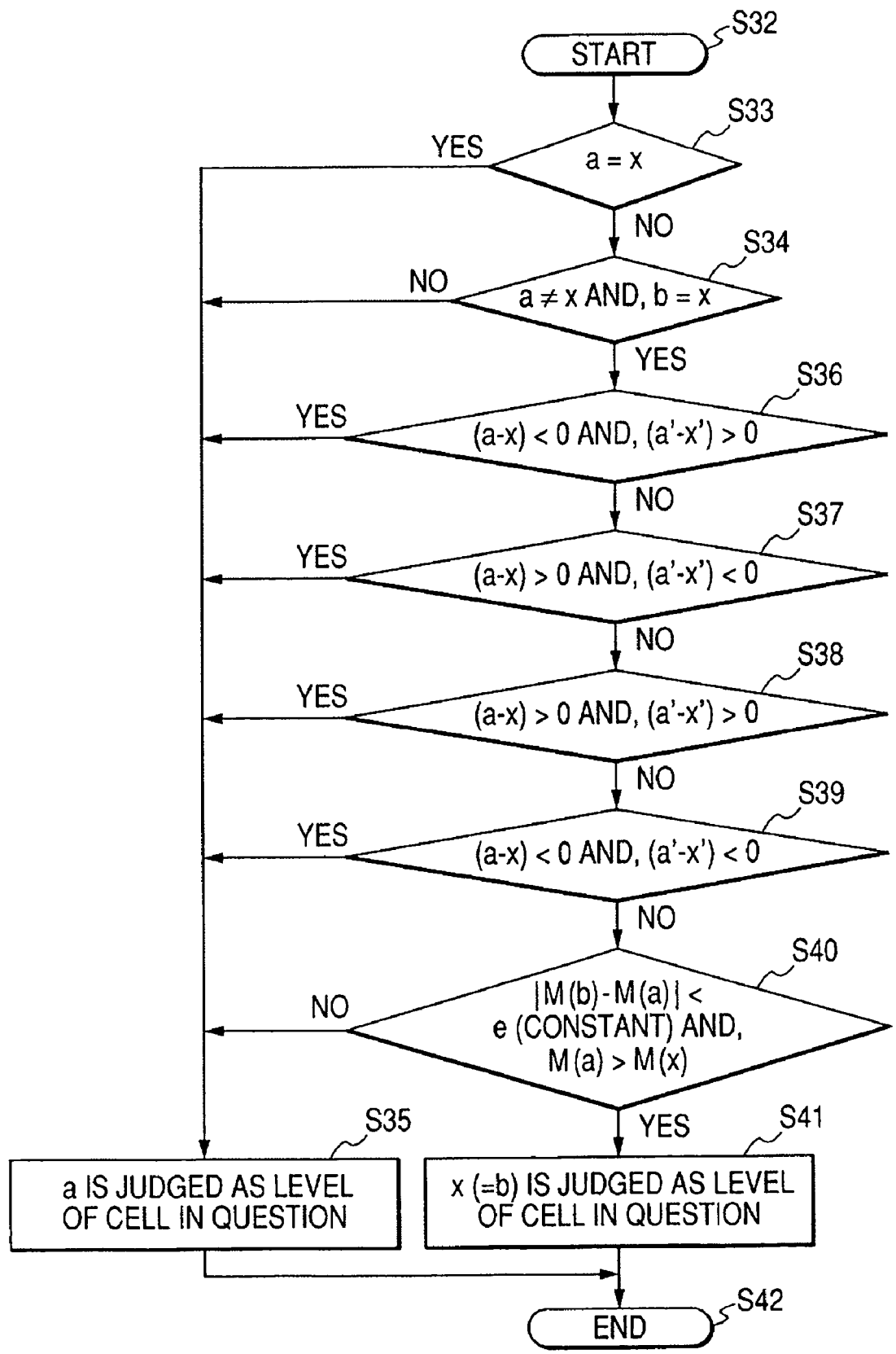
FIG. 25 is a diagram illustrating an algorithm that is used in FIG. 24 to judge the mult-level of the cell in question.
Figure 26:
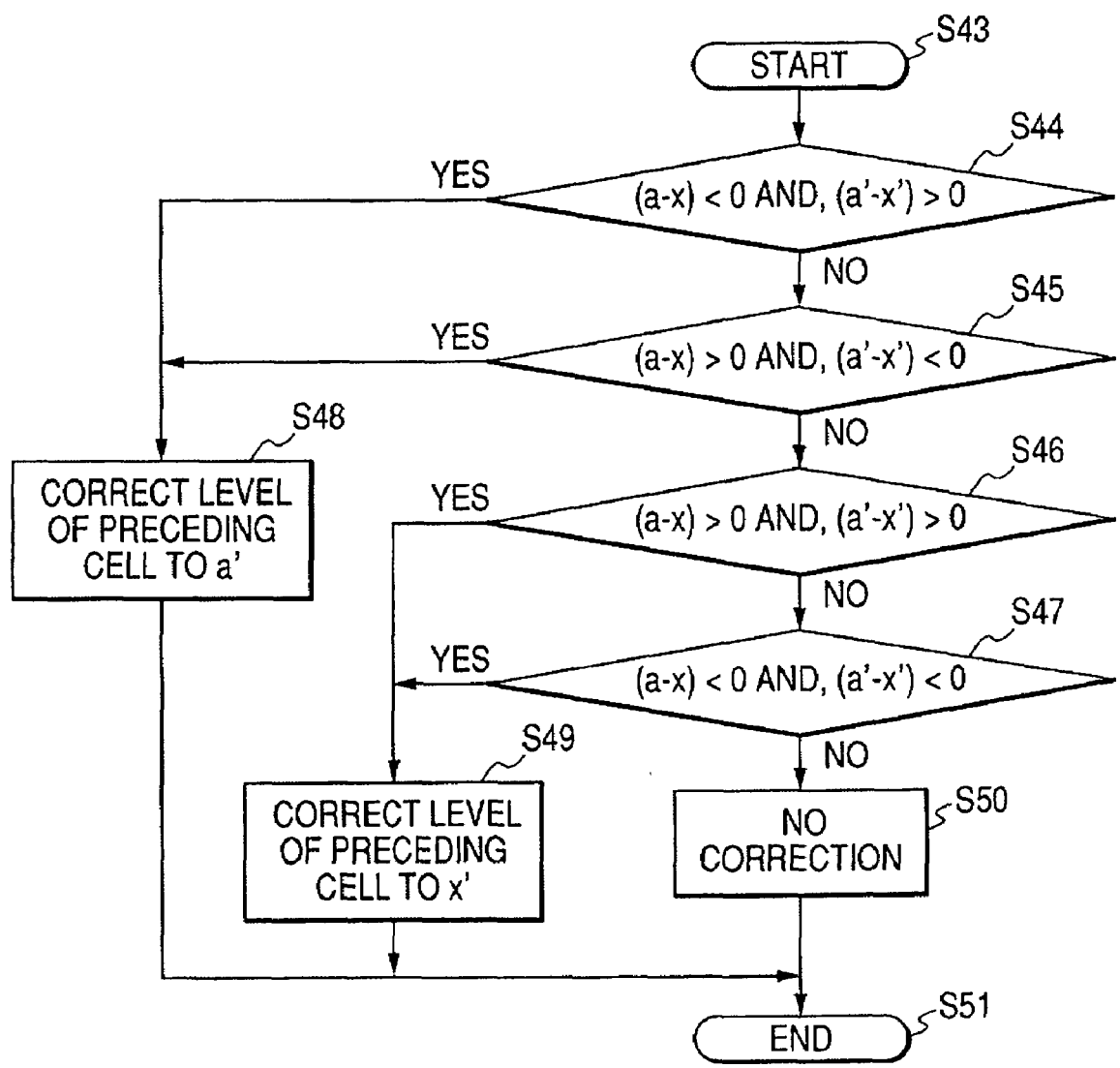
FIG. 26 is a diagram illustrating an algorithm that is used in FIG. 24 to correct the level of the preceding cell.

A detailed description is given with reference to FIGS. 24, 25 and 26 on algorithms employed by the final value judging portion 121, which makes final judgment based on the candidate values obtained by the cell center value judging portion 119 and the cell border value judging portion 120 in FIG. 20.

FIG. 24 shows a flow of the processing operation conducted by the final value judging portion 121. First, operation is started in Step S25. In Step S26, the candidate levels of "a", "b" and "x" and the corresponding M values of M(a), M(b) and M(x) are inputted to the final value judging portion 121. In Step S27, "a'" and "x'", which are candidate values selected for the preceding cell, are read out of the memory. "a'" and "x'" correspond to "a" and "x" that are stored in the memory in Step S30, which will be described later, before a series of final value judging operation is ended in one step back up the flow. Using these parameters, the final value judging portion 121 determines in Step S28 the level of the cell in question for the last time, and corrects the level of the preceding cell in Step S29. In Step S30, "a" and "x" are stored in the memory. Thereafter, the processing proceeds to Step S31, where the operation is ended.

Next, an algorithm employed in Step S28 to make a final judgment on the level of the cell in question is described in detail with reference to FIG. 25. In Step S32, operation is started. In Step S33, a case of a=x is examined. This case is considered to stand a good chance for the correct answer, and therefore the processing proceeds to Step S35 where the level of the cell in question is determined as "a", and then proceeds to Step S42, where the operation is ended. Then, in Step S34, a case of a≠x and b=x is examined.

In this case, it is difficult to judge which of "a" and "x" is the correct answer, and therefore a decision has to be made by taking other parameters into account. In the present invention, "a'" and "x'" which are candidate values selected for the preceding cell, and M(a), M(b) and M(x) which are the absolute values of differences from reference values in the learning tables are treated as parameters.

A method of judging by taking "a'" and "x'" into account in Steps S36 to S39 is described below. This is carried out for further improving the accuracy of identifying the level of the cell in question by studying the relation between the candidate value of the preceding cell and a candidate value of the cell in question. In other words, this utilizes rules naturally existing between a candidate value of the cell in question and a candidate value of the preceding cell when the result of judgment made for the preceding cell does not match the actual correct value. A case of erroneously judging x' as the final value of the preceding cell is considered first.

For instance, in the case of the correct level of both the preceding cell and the cell in question being "3", when the candidate values a' and x' for the preceding cell are "3" and "2", respectively, if "2" is erroneously selected as the final judgment value for x', there is a high probability that the candidate values a and x for the cell in question are "3" and "4", respectively. This is because, as mentioned above, the relation of X+Y=Z (or Z−X=Y) is established when the level of the preceding cell is given as "X" (X is an integer that satisfies 0≦X≦7), "Y" represents the level of the following cell (Y is an integer that satisfies 0≦Y≦7), and "Z" represents the cell border value (Z is an integer that satisfies 0≦Z≦14) (in this case, Z=6).

This is expressed by a general formula as follows:

(a−x)<0 and (a'−x')>0          Step S36, or (a−x)>0 and (a'−x')<0          Step S37

In the case where Step S36 or S37 is satisfied, there is a high possibility that "x" is wrong. Accordingly, the level of the cell in question is determined ultimately as "a" in Step S35, and the operation is ended in Step S42.

A reverse case where a' is erroneously judged as the final value for the preceding cell is considered. In the case of the correct level being "3", when and the candidate values a' and x' for the preceding cell are "4" and "3", respectively, when both the preceding cell and the cell in question if "4" is erroneously selected as the final judgment value for a', there is a high probability that the candidate values a and x for the cell in question are "3" and "2", respectively.

This is expressed by a general formula as follows:

(a−x)>0 and (a'−x')>0          Step S38, or (a−x)<0 and (a'−x')<0          Step S39

In the case where Step S38 or S39 is satisfied, there is a high possibility that "x" is wrong. Accordingly, the level of the cell in question is determined ultimately as "a" in Step S35, and the operation is ended in Step S42. The above description is the method of making a final judgment by taking "a'" and "x'" into account.

When none of the conditions of Steps S36 to S39 is met, a secondary method is employed in which a final judgment is made by taking M(a), M(b), and M(x) into account. That is, in Step S41, the level of the cell in question is determined ultimately as "x (=b)" if the following condition is satisfied:

|M(b)−M(a)|<e and M(a)>M(x)          Step S40 wherein e represents a certain constant, and is desirably set to a value of ½ to ¼ of a difference in reproduced signals of cell center values between the multi-levels.

As described above, it is very difficult to decide whether a cell in question is "a" or "b", based on a reproduced signal of a cell center value when the condition |M(b)−M(a)|<e is met. In the ultimate case where |M(b)−M(a)|=0, the level of the cell in question has a fifty-fifty percent chance of being "a" or "b". Therefore, when the condition M(a)>M(x) is satisfied, it is judged that the level of the cell in question is very likely to be "x (=b)", and the operation is ended in Step S42.

Lastly, a case of not satisfying the conditions of Steps S33 and S34 (a≠x and b≠x) is considered. In this case, there is a high possibility that "x" is wrong. Accordingly, the level of the cell in question is determined as "a" in Step S35, and the operation is ended in Step S42. This is because, in multi-level recording, simulation results show that error in reproduction is mostly within ±1 level (meaning that "a" or "b" is the correct answer), and there is a very low probability that "x" is a correct answer.

Returning to FIG. 24, the level of the cell in question is determined for the last time in Step S28, and then the level of the preceding cell is corrected in Step S29.

FIG. 26 shows an algorithm employed to correct the level of the preceding cell in Step S29. First, operation is started in Step S43. In Steps S44 to 47, the value decided finally for the preceding cell is corrected by studying the relation between a candidate value of the preceding cell and a candidate value of the cell in question as described above with reference to FIG. 25.

In other words, it is judged that the result of judgment for the preceding cell does not match the actual correct value when there are certain rules between a candidate value for the cell in question and a candidate value for the preceding cell. For instance, in the case of when the correct level of both the preceding cell and the cell in question being "3", when the candidate values a' and x' for the preceding cell are "3" and "2", respectively, if "2" is erroneously selected as the final judgment value for x', there is a high probability that the candidate values a and x for the cell in question are "3" and "4", respectively.

This is expressed by a general formula as follows:

(a−x)<0 and (a'−x')>0    Step S44, or (a−x)>0 and (a'−x')<0    Step S45

Accordingly, when the Step S44 or S45 is satisfied, the processing proceeds to Step S48, where the level of the preceding cell is corrected to "a'", and the operation is ended in Step S51. In this case, identifying the level of the preceding cell as x' being "2" is judged as wrong, and the level of the preceding cell is corrected to "3" as a'.

A reverse case where a' is erroneously judged as the final value for the preceding cell is considered. In the case of the correct level of both the preceding cell and the cell in question being "3", when the candidate values a' and x' for the preceding cell are "4" and "3", respectively, if "4" is erroneously selected as the final judgment value for a', there is a high probability that the candidate values a and x for the cell in question are "3" and "2", respectively.

This is expressed by a general formula as follows:

(a−x)>0 and (a'−x')>0    Step S46, or (a−x)<0 and (a'−x')<0    Step S47

When the Step S46 or S47 is satisfied, the processing proceeds to Step S49, where the level of the preceding cell is corrected to "x'", and the operation is ended in Step S51. In this case, identifying the level of the preceding cell as a' being "4" is judged as wrong, and the level of the preceding cell is corrected to "3" as x'.

The above description is details of the final value judging portion of FIG. 24, and methods of judging multi-level data in the multi-level data judging circuit 115 which is one of features of the present invention.

In addition, a multi-level information recording and reproducing apparatus according to the present invention can have, without altering the essence of the present invention, circuits and the like not mentioned in the above such as an error correction data adding circuit, which adds data for correcting error to 2-level data inputted, and a synchronization signal adding circuit, which adds a synchronization signal for sectioning data into a predetermined amount.

This application claims priority from Japanese Patent Application Nos. 2004-337574 filed Nov. 22, 2004 and 2005-047198 filed Feb. 23, 2005, which are hereby incorporated by reference herein.

What is claimed is:

1. A multi-level information method of recording or reproducing multi-level information by virtually setting cells at constant intervals on a track of an optical information medium wherein information is recorded or reproduced with a light spot and by varying an information pit width in a direction of the track or an information pit area, comprising the steps of:
  detecting a reproduced signal by radiating a light spot onto the track;
  detecting a cell border value by sampling the reproduced signal when the center of the light spot falls on a border between one cell and its following cell;
  judging multi-level information of the following cell based on the cell border value; and
  detecting a cell center value by sampling the reproduced signal when the center of the light spot falls on the center of a cell, wherein, in the judging step, multi-level information of a cell is judged based on both of the cell border value and the cell center value;
  wherein, in the judging step, a candidate value based on the cell border value and a candidate value based on the cell center value are determined to judge final multi-level information from a plurality of candidate values; and
  wherein, in the judging step, when a first candidate value obtained from the cell center value is given as "a" a second candidate value is given as "b", and a third candidate value obtained from the cell border value is given as "x" in the judging step if "a"=x, "a" is judged as multi-level information of the following cell if "a"="x".

2. The multi-level information method according to claim 1, wherein in the judging step, if x=b, and M(a), M(b) and M(x) which are absolute values of differences between a value at the first candidate value "a" in a cell center value learning table and the following cell center value, between a value at the second candidate value "b" in the cell center value learning table and the following cell center value, and between a value at the third candidate value "x" in a cell border value learning table and the cell border value, said differences satisfy the following condition:

|M(b)−M(a)|<e and M(a)>M(x), where e is a constant, "x" which equals "b", is judged step is judged as multi-level information of the following cell.

3. The multi-level information method according to claim 1, wherein, in judging multi-level information of the cell, which is placed immediately before the following cell, when the first candidate value obtained from the cell center value is given as "a" and the candidate value obtained from a preceding cell border value, which is a cell border value by sampling the reproduced signal when the center of the light spot falls on a border between the cell and its preceding cell is given as "x", if the following condition is satisfied:

$(a-x)<0$ and $(a'-x')>0$, $(a-x)>0$ and $(a'-x')<0$, or $(a-x)>0$ and $(a'-x')<0$, $(a-x)<0$ and $(a'-x')<0$, "a" is judge as multi-level information of the cell in question.

4. The multi-level information method according to claim 1,
wherein, in judging multi-level information of the preceding cell which is placed immediately before the following cell, when the first candidate value obtained from the cell center value is given as "a" and the candidate value obtained from a preceding cell border value, which is a cell border value obtained by sampling the reproduced signal when the center of the light spot falls on a border between the cell and its preceding cell is given as "x", if the following condition is satisfied:

$(a-x)<0$ and $(a'-x')>0$ or $(a-x)>0$ and $(a'-x')<0$, multi-level information of the cell is corrected to "a'", and wherein if the following condition is satisfied:

$(a-x)>0$ and $(a'-x')>0$, or $(a-x)<0$ and $(a'-x')<0$, multi-level information of the preceding cell is corrected to "x'".

* * * * *